United States Patent
Gao et al.

(10) Patent No.: US 12,164,715 B2
(45) Date of Patent: Dec. 10, 2024

(54) DISPLAY PANEL AND PREPARATION METHOD THEREOF, AND DISPLAY TOUCH APPARATUS

(71) Applicants: Chengdu BOE Optoelectronics Technology Co., Ltd., Sichuan (CN); BOE Technology Group Co., Ltd., Beijing (CN)

(72) Inventors: Wenhui Gao, Beijing (CN); Peng Xu, Beijing (CN); Shun Zhang, Beijing (CN); Tiaomei Zhang, Beijing (CN); Kai Zhang, Beijing (CN); Zhiliang Jiang, Beijing (CN); Lingran Wang, Beijing (CN)

(73) Assignees: Beijing BOE Technology Development Co., Ltd., Beijing (CN); Chengdu BOE Optoelectronics Technology Co., Ltd., Sichuan (CN)

(*) Notice: Subject to any disclaimer, the term of this patent is extended or adjusted under 35 U.S.C. 154(b) by 0 days.

(21) Appl. No.: 17/762,093

(22) PCT Filed: May 11, 2021

(86) PCT No.: PCT/CN2021/093055
§ 371 (c)(1),
(2) Date: Nov. 17, 2022

(87) PCT Pub. No.: WO2022/236680
PCT Pub. Date: Nov. 17, 2022

(65) Prior Publication Data
US 2024/0111376 A1     Apr. 4, 2024

(51) Int. Cl.
*G06F 3/041* (2006.01)
*G06F 3/044* (2006.01)

(52) U.S. Cl.
CPC ........ *G06F 3/0412* (2013.01); *G06F 3/04164* (2019.05); *G06F 3/0444* (2019.05);
(Continued)

(58) Field of Classification Search
None
See application file for complete search history.

(56) References Cited

U.S. PATENT DOCUMENTS

| | | | |
|---|---|---|---|
| 2017/0090629 | A1 | 3/2017 | Kim et al. |
| 2018/0150170 | A1 | 5/2018 | Oh et al. |

(Continued)

FOREIGN PATENT DOCUMENTS

| | | | |
|---|---|---|---|
| CN | 106557198 A | 4/2017 | |
| CN | 108133950 A | 6/2018 | |

(Continued)

*Primary Examiner* — Brian M Butcher
(74) *Attorney, Agent, or Firm* — Ling Wu; Stephen Yang; Ling and Yang Intellectual Property

(57) ABSTRACT

Disclosed is a display panel including a base substrate. The base substrate includes a display region, a wiring lead-out region and a signal access region that are located on a side of the display region. The wiring lead-out region is located between the display region and the signal access region. The wiring lead-out region includes: at least one first power supply line, at least one first touch signal line, and at least one first display signal line that are disposed on the base substrate. The first touch signal line is located on a side of the first power supply line away from the base substrate, and the first display signal line is located on a side of the first power supply line close to the base substrate.

19 Claims, 9 Drawing Sheets

(52) U.S. Cl.
    CPC .............. *G06F 2203/04103* (2013.01); *G06F 2203/04107* (2013.01)

(56) References Cited

U.S. PATENT DOCUMENTS

| | | | |
|---|---|---|---|
| 2019/0332202 A1 | 10/2019 | Huang et al. | |
| 2022/0206606 A1* | 6/2022 | Ye | G06F 3/0443 |
| 2022/0216290 A1 | 7/2022 | Zheng et al. | |

FOREIGN PATENT DOCUMENTS

| | | | |
|---|---|---|---|
| CN | 111710712 A | 9/2020 |
| CN | 112114701 A | 12/2020 |
| CN | 112416168 A | 2/2021 |
| CN | 112563309 A | 3/2021 |
| CN | 112711349 A | 4/2021 |
| CN | 112768495 A | 5/2021 |
| EP | 4006987 A1 | 6/2022 |
| WO | 2008133432 A1 | 11/2008 |

* cited by examiner

DISPLAY PANEL AND PREPARATION METHOD THEREOF, AND DISPLAY TOUCH APPARATUS

CROSS-REFERENCE TO RELATED APPLICATION

The present application is a U.S. National Phase Entry of International Application No. PCT/CN2021/093055 having an international filing date of May 11, 2021. The above-identified application is hereby incorporated by reference.

TECHNICAL FIELD

The present disclosure relates to, but is not limited to, the field of display technologies, and particularly to a display panel and a preparation method thereof, and a display touch apparatus.

BACKGROUND

An Organic Light emitting Diode (OLED) is an active light emitting display device, and has advantages of self-luminescence, wide viewing angle, high contrast ratio, low power consumption, and extremely high response speed, etc. With continuous development of display technologies, a display apparatus using an OLED as a light emitting device and using a Thin Film Transistor (TFT) for signal control has become a mainstream product in the field of display at present.

SUMMARY

The following is a summary for subject matters described herein in detail. The summary is not intended to limit the scope of protection of claims.

Embodiments of the present disclosure provide a display panel and a preparation method thereof, and a display touch apparatus.

In one aspect, an embodiment of the present disclosure provides a display panel, including a base substrate, a display structure layer, a touch structure layer, at least one first power supply line, at least one first display signal line, and at least one first touch signal line. The base substrate includes a display region, a wiring lead-out region and a signal access region located on a side of the display region, wherein the wiring lead-out region is located between the display region and the signal access region. The display structure layer and the touch structure layer are located in the display region, and the touch structure layer is disposed on a side of the display structure layer away from the base substrate. The at least one first power supply line, the at least one first touch signal line, and the at least one first display signal line are located in the wiring lead-out region. The first power supply line is connected with the display structure layer, the first display signal line is connected with the display structure layer, and the first touch signal line is connected with the touch structure layer. The first touch signal line is located on a side of the first power supply line away from the base substrate, and the first display signal line is located on a side of the first power supply line close to the base substrate. An orthographic projection of the first touch signal line on the base substrate is at least partially overlapped with an orthographic projection of the first power supply on the base substrate.

In some exemplary embodiments, the orthographic projection of the first touch signal line on the base substrate is not overlapped with an orthographic projection of the first display signal line on the base substrate.

In some exemplary embodiments, the orthographic projection of the first touch signal line on the base substrate is located within the orthographic projection of the first power supply line on the base substrate.

In some exemplary embodiments, the base substrate further includes a bending region. The wiring lead-out region includes a first wiring lead-out region and a second wiring lead-out region that are disposed in sequence along a direction away from the display region; the bending region is located between the first wiring lead-out region and the second wiring lead-out region. The bending region includes at least one first power supply connecting line, at least one touch signal connecting line, and at least one display signal connecting line that are disposed on the base substrate. The first power supply connecting line, the touch signal connecting line, and the display signal connecting line are of a same layer structure, and the first power supply connecting line is located between the touch signal connecting line and the display signal connecting line.

In some exemplary embodiments, the first touch signal line in the wiring lead-out region includes a first sub-touch signal line located in the first wiring lead-out region and a second sub-touch signal line located in the second wiring lead-out region. The first display signal line in the wiring lead-out region includes a first sub-display signal line located in the first wiring lead-out region and a second sub-display signal line located in the second wiring lead-out region. The touch signal connecting line is connected with the first sub-touch signal line and the second sub-touch signal line; and the display signal connecting line is connected with the first sub-display signal line and the second sub-display signal line; the first sub-touch signal line and the second sub-touch signal line are located on a side of the touch signal connecting line away from the base substrate, and the first sub-display signal line and the second sub-display signal line are located on a side of the display signal connecting line close to the base substrate.

In some exemplary embodiments, the first power supply line in the wiring lead-out region includes a first sub-power supply line located in the first wiring lead-out region and a second sub-power supply line located in the second wiring lead-out region; the first power supply connecting line is connected with the first sub-power supply line and the second sub-power supply line; and the first sub-power supply line, the first power supply connecting line, and the second sub-power supply line are of an integrated structure.

In some exemplary embodiments, the first power supply connecting line, the touch signal connecting line, and the display signal connecting line in the bending region all extend along a first direction. In a second direction, at least one display signal connecting line, at least one first power supply connecting line, at least one touch signal connecting line, at least one first power supply connecting line, and at least one display signal connecting line are arranged in sequence in the bending region. The first direction and the second direction are located in a same plane, and the first direction is perpendicular to the second direction.

In some exemplary embodiments, the display structure layer at least includes a drive circuit layer disposed on the base substrate; the drive circuit layer at least includes an active layer, a first gate metal layer, a second gate metal layer, and a source-drain metal layer that are disposed on the base substrate. The first power supply connecting line, the touch signal connecting line, and the display signal connecting line in the bending region are of a same layer structure as the source-drain metal layer in the display region. The at least one first display signal line in the wiring lead-out region is of a same layer structure as the first gate metal layer or the second gate metal layer in the display region. The touch structure layer at least includes a touch electrode layer. The at least one first touch signal line in the wiring lead-out region is of a same layer structure as the touch electrode layer in the display region. The first power supply line of the wiring lead-out region is of a same layer structure as the source-drain metal layer in the display region.

In some exemplary embodiments, the wiring lead-out region further includes at least one second power supply line The bending region further includes at least one second power supply connecting line disposed on the base substrate The second power supply line in the wiring lead-out region includes a third sub-power supply line located in the first wiring lead-out region and a fourth sub-power supply line located in the second wiring lead-out region The second power supply connecting line is connected with the third sub-power supply line and the fourth sub-power supply line. In the bending region, the second power supply connecting line is located on a side of the display signal connecting line away from the first power supply connecting line In some exemplary embodiments, the wiring lead-out region includes a plurality of first display signal lines. The plurality of first display signal lines are divided into a first group of first display signal lines and a second group of first display signal lines; and an orthographic projection of the at least one first touch signal line on the base substrate is located between orthographic projections of the first group of first display signal lines and the second group of first display signal lines on the base substrate In some exemplary embodiments, the plurality of first display signal lines in the wiring lead-out region include at least one first data lead and at least one first drive control signal line; and an orthographic projection of the first drive control signal line on the base substrate is adjacent to the orthographic projection of the first touch signal line on the base substrate.

In some exemplary embodiments, the display structure layer includes at least one light emitting element, the light emitting element including: a first electrode, a second electrode, and an organic emitting layer located between the first electrode and the second electrode; the first electrode is located on a side of the second electrode close to the base substrate. The base substrate further includes: a first border region located between the display region and the wiring lead-out region; the first border region is provided with a display control circuit and at least one second touch signal line; the second touch signal line is connected with the first touch signal line in the wiring lead-out region. In the first border region, an orthographic projection of the second touch signal line on the base substrate is located within an orthographic projection of the second electrode on the base substrate.

In some exemplary embodiments, the first power supply line is a high-voltage power supply line.

In some exemplary embodiments, the signal access region is provided with a Touch and Display Driver Integration (TDDI) circuit; and the TDDI circuit is connected with the first display signal line and the first touch signal line in the wiring lead-out region.

In another aspect, an embodiment of the present disclosure provides a display touch apparatus including the above-mentioned display panel.

In another aspect, an embodiment of the present disclosure provides a preparation method of a display panel, including: forming a display structure layer and a touch structure layer in sequence in a display region of a base substrate, and forming a first power supply line, at least one first touch signal line, and at least one first display signal line in a wiring lead-out region between the display region and a signal access region of the base substrate. Among them, the first power supply line and the first display signal line are connected with the display structure layer, and the first touch signal line is connected with the touch structure layer. The first touch signal line is located on a side of the first power supply line away from the base substrate, and the first display signal line is located on a side of the first power supply line close to the base substrate; and an orthographic projection of the first touch signal line on the base substrate is at least partially overlapped with an orthographic projection of the first power supply line on the base substrate.

After the accompanying drawings and detailed descriptions are read and understood, other aspects may be understood.

BRIEF DESCRIPTION OF DRAWINGS

The accompanying drawings are used for providing further understanding of technical solutions of the present disclosure, constitute a part of the specification, and are used for explaining the technical solutions of the present disclosure together with the embodiments of the present disclosure, but do not constitute limitations to the technical solutions of the present disclosure. Shapes and sizes of one or more components in the drawings do not reflect actual scales, and are only intended to schematically describe the contents of the present disclosure.

DETAILED DESCRIPTION

Figure 1:
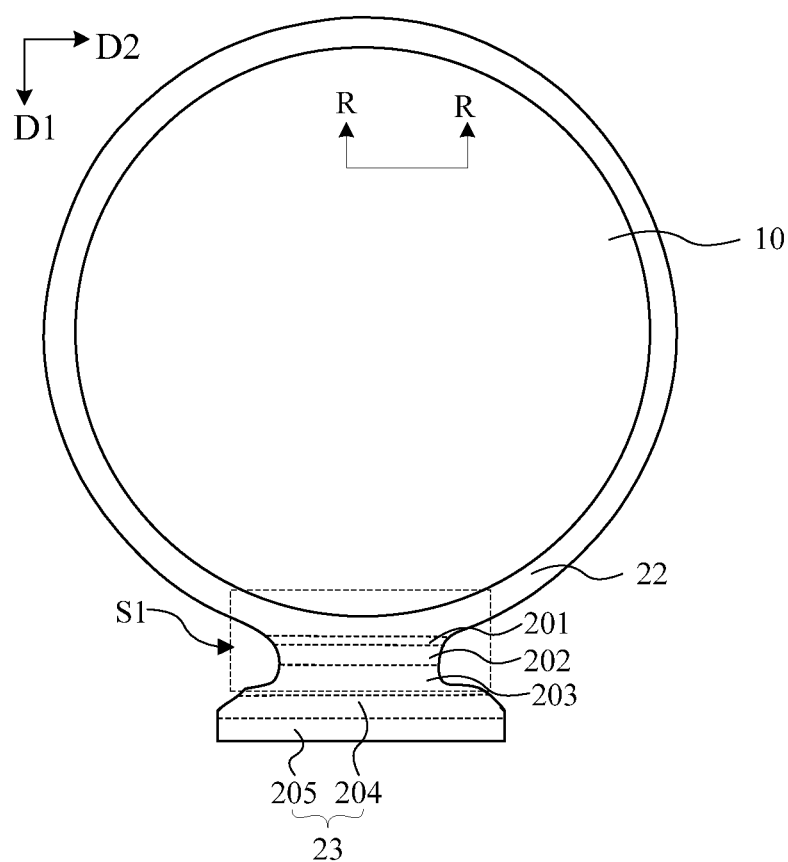
FIG. 1 is a schematic diagram of a display panel according to at least one embodiment of the present disclosure.

The embodiments of the present disclosure will be described below with reference to the drawings in detail. Embodiments may be implemented in multiple different forms. Those of ordinary skill in the art may easily understand such a fact that manners and contents may be transformed into various forms without departing from spirit and scope of the present disclosure. Therefore, the present disclosure should not be construed as only being limited to the contents recorded in the following embodiments. The embodiments in the present disclosure and features in the embodiments may be combined arbitrarily with each other without conflict.

In the drawings, a size of one or more constituent elements and a thickness of a layer or a region are sometimes exaggerated for clarity. Therefore, an implementation of the present disclosure is not necessarily limited to the size shown, and a shape and a size of one or more components in the drawings do not reflect true proportions. In addition, the accompanying drawings schematically show ideal examples, and an implementation of the present disclosure is not limited to a shape, a numerical value, or the like shown in the accompanying drawings.

Ordinal numerals such as "first", "second", and "third" in the specification are set to avoid confusion of constituent elements, but are not intended to limit in terms of quantity. In the present disclosure, "plurality" represents two or more than two.

In the specification, for convenience, words and sentences indicating orientations or positional relationships, such as "center", "upper", "lower", "front", "back", "vertical", "horizontal", "top", "bottom", "inside", and "outside", are used for describing positional relationships of constituent elements with reference to the accompanying drawings, and are merely for facilitating describing the specification and simplifying the description, rather than indicating or implying that referred apparatuses or elements must have particular orientations, and be constructed and operated in particular orientations. Thus, they cannot be construed as limitations to the present disclosure. The positional relationships of the constituent elements appropriately change according to directions of describing the constituent elements. Therefore, it is not limited to the words and sentences described in the specification, which may be replaced appropriately according to a situation.

In the specification, unless otherwise specified and defined explicitly, terms "mounted", "mutually connected", and "connection" should be broadly understood. For example, it may be a fixed connection, a detachable connection, or an integrated connection, it may be a mechanical connection or a connection, and it may be a direct connection, an indirect connection through intermediate components, or communication inside two components. Those of ordinary skill in the art may understand specific meanings of these terms in the present disclosure according to specific situations.

In the specification, a transistor refers to an element that at least includes three terminals, that is, a gate electrode, a drain electrode, and a source electrode. The transistor has a channel region between the drain electrode (drain electrode terminal, drain region, or drain electrode) and the source electrode (source electrode terminal, source region, or source electrode), and a current may flow through the drain electrode, the channel region, and the source region. In the specification, the channel region refers to a region which the current mainly flows through.

In the specification, a first electrode may be a drain electrode, and a second electrode may be a source electrode. Or, a first electrode may be a source electrode, and a second electrode may be a drain electrode. In cases that transistors with opposite polarities are used, or a direction of a current changes during work of a circuit, or the like, functions of the "source electrode" and the "drain electrode" may sometimes be exchanged. Therefore, the "source electrode" and the "drain electrode" may be exchanged in the specification.

In this specification, "connection" includes a case where composition elements are connected with each other through an element having some electric function. The "element having some electric function" is not particularly limited as long as electric signals between the connected composition elements may be transmitted. An example of the "element having some electric function" includes not only an electrode and a wiring, but also a switching element such as a transistor, a resistor, an inductor, a capacitor, and another element having various functions, etc.

In the specification, "parallel" refers to a state in which an angle formed by two straight lines is greater than −10° and less than 10°, and thus may also include a state in which the angle is greater than −5° and less than 5°. In addition, "perpendicular" refers to a state in which an angle formed by two straight lines is greater than 80° and less than 100°, and thus may also include a state in which the angle is greater than 85° and less than 95°.

In the present disclosure, "about" refers to that a boundary is defined not so strictly and numerical values within process and measurement error ranges are allowed.

A display panel according to an embodiment of the present disclosure may be integrated with a touch structure. The display substrate may include a Liquid Crystal Display (LCD) substrate, or may be an Organic Light Emitting Diode (OLED) display substrate, or may be a Plasma Display apparatus (such as Plasma Display Panel (PDP)) display substrate, or may be an Electrophoretic Display (EPD) display substrate. In some examples, the display panel may include an OLED display substrate, and the OLED display substrate may include a base substrate, a drive circuit layer disposed on the base substrate, a light emitting element layer disposed on the drive circuit layer, and an encapsulation layer disposed on the light emitting element layer. The touch structure is disposed on the encapsulation layer of the display substrate to form a structure of Touch on Thin Film Encapsulation (Touch on TFE for short), a display structure and the touch structure are integrated together, which has advantages of being light and thin, and foldable, and may meet requirements of products such as flexible folding and narrow borders.

The structure of Touch on TFE mainly includes a structure of Flexible Multi-Layer On Cell (FMLOC for short) and a structure of Flexible Single-Layer On Cell (FSLOC for short). The structure of FMLOC is based on a working principle of mutual capacitance detection, generally two layers of metal are used for forming a drive (Tx) electrode and a sense (Rx) electrode, and an Integrated Circuit (IC) achieves a touch action by detecting a mutual capacitance between the drive (Tx) electrode and the sense (Rx) electrode. The structure of FSLOC is based on a working principle of self-capacitance (or voltage) detection, generally a single layer of metal is used for forming a touch electrode, and an integrated circuit achieves a touch action by detecting a self-capacitance (or voltage) of the touch electrode.

At least one embodiment of the present disclosure provides a display panel, including a base substrate, a display structure layer, a touch structure layer, at least one first power supply line, at least one first display signal line, and at least one first touch signal line. The base substrate includes a display region, a wiring lead-out region, and a signal access region which are located on a side of the display region. The wiring lead-out region is located between the display region and the signal access region. The display structure layer and the touch structure layer are located in the display region, and the touch structure layer is disposed on a side of the display structure layer away from the base substrate. At least one first power supply line, at least one first touch signal line, and at least one first display signal line are located in the wiring lead-out region. A first power supply line is connected with the display structure layer, a first display signal line is connected with the display structure layer, and a first touch signal line is connected with the touch structure layer. The first touch signal line is located on a side of the first power supply line away from the base substrate, and the first display signal line is located on a side of the first power supply line close to the base substrate. An orthographic projection of the first touch signal line on the base substrate is at least partially overlapped with an orthographic projection of the first power supply on the base substrate.

In the display panel according to the embodiment of the present disclosure, in the wiring lead-out region, the first touch signal line and the first display signal line are isolated by using the first power supply line. Since the first power supply line transmits a Direct Current (DC) signal and the DC signal cannot pass through a plate capacitance structure formed between film layers, a signal interference generated between the first touch signal line and the first display signal line may be reduced by utilizing the first power supply line, thereby improving display and touch effects.

In some exemplary embodiments, within the wiring lead-out region, an orthographic projection of the first touch signal line on the base substrate is not overlapped with an orthographic projection of the first display signal line on the base substrate. In this exemplary embodiment, the first touch signal line and the first display signal line may be prevented from being overlapped in a direction perpendicular to the base substrate to form a capacitive structure, so that an influence of signal crosstalk may be reduced, thereby improving display and touch effects.

In some exemplary embodiments, an orthographic projection of the first touch signal line on the base substrate is within an orthographic projection of the first power supply line on the base substrate. In this exemplary embodiment, the orthographic projection of the first power supply line on the base substrate is utilized to cover the orthographic projection of the first touch signal line on the base substrate, so that signal crosstalk generated between the first touch signal line and the first display signal line in the wiring lead-out region may be reduced, thereby improving display and touch effects.

In some exemplary embodiments, the base substrate may further include a bending region. The wiring lead-out region includes a first wiring lead-out region and a second wiring lead-out region which are disposed in sequence in a direction away from the display region. The bending region is located between the first wiring lead-out region and the second wiring lead-out region. The bending region includes at least one first power supply connecting line, at least one touch signal connecting line, and at least one display signal connecting line that are disposed on the base substrate. A first power supply connecting line, a touch signal connecting line, and a display signal connecting line are in a same layer, and the first power supply connecting line is located between the touch signal connecting line and the display signal connecting line. In this exemplary embodiments, the touch signal connecting line and the display signal connecting line are separated by using the first power supply connecting line in the bending region, so that a signal interference between the display signal connecting line and the touch signal connecting line may be reduced, thereby improving display and touch effects.

In some exemplary embodiments, the first touch signal line in the wiring lead-out region includes a first sub-touch signal line located in the first wiring-out region, and a second sub-touch signal line located in the second wiring lead-out region. The first display signal line in the wiring lead-out region includes a first sub-display signal line located in the first wiring lead-out region and a second sub-display signal line located in the second wiring lead-out region. The touch signal connecting line is connected with the first sub-touch signal line and the second sub-touch signal line. The display signal connecting line is connected with the first sub-display signal line and the second sub-display signal line. The first sub-touch signal line and the second sub-touch signal line are located on a side of the touch signal connecting line away from the base substrate, and the first sub-display signal line and the second sub-display signal line are located on a side of the display signal connecting line close to the base substrate. In this exemplary embodiment, a display signal connecting line in the bending region is utilized to connect corresponding sub-display signal lines in the first wiring lead-out region and the second wiring lead-out region, and a touch signal connecting line in the bending region is utilized to connect corresponding sub-touch signal lines in the first wiring lead-out region and the second wiring lead-out region, so that transmissions of a display signal and a touch signal may be achieved.

In some exemplary embodiments, the first power supply line of the wiring lead-out region includes a first sub-power supply line located in the first wiring lead-out region, and a second sub-power supply line located in the second wiring lead-out region. The first power supply connecting line is connected with the first sub-power supply line and the second sub-power supply line. The first sub-power supply line, the first power supply connecting line, and the second sub-power supply line may have an integrated structure. However, the embodiments are not limited thereto. For example, the first sub-power supply line may be of a same layer structure as the second sub-power supply line, and may be of a different layer structure from the first power supply connecting line. In this exemplary embodiment, the first power supply connecting line in the bending region is utilized to connect sub-power supply lines in the first wiring lead-out region and the second wiring lead-out region to achieve a transmission of a first power supply signal.

In some exemplary embodiments, the first power supply connecting line, the touch signal connecting line, and the display signal connecting line within the bending region all extend along a first direction. In a second direction, at least one display signal connecting line, at least one first power supply connecting line, at least one touch signal connecting line, at least one first power supply connecting line, and at least one display signal connecting line are arranged in sequence in the bending region. The first direction and the second direction are in a same plane, and the first direction is perpendicular to the second direction. In this embodiment, the first power supply connecting line separates the display signal connecting line from the touch signal connecting line, so that a signal interference between the display signal connecting line and the touch signal connecting line may be reduced, thereby improving display and touch effects.

In some exemplary embodiments, the display structure layer at least includes the drive circuit layer disposed on the base substrate. The drive circuit layer at least includes an active layer, a first gate metal layer, a second gate metal layer, and a source-drain metal layer which are disposed on the base substrate. A first power supply connecting line, a touch signal connecting line, and a display signal connecting line in the bending region are of a same layer structure as a source-drain metal layer in the display region. At least one first display signal line in the lead-out region is of a same layer structure as a first gate metal layer or a second gate metal layer in the display region. The touch structure layer at least includes a touch electrode layer. At least one first touch signal line in the wiring lead-out region is of a same layer structure as the touch electrode layer in the display region. The first power supply line in the wiring lead-out region is of a same layer structure as the source-drain metal layer in the display region. However, the embodiments are not limited thereto.

In some exemplary embodiments, the wiring lead-out region further includes at least one second power supply line disposed on the base substrate, and the bending region further includes at least one second power supply connecting line disposed on the base substrate. A second power supply line in the wiring lead-out region includes a third sub-power supply line located in the first wiring lead-out region and a fourth sub-power supply line located in the second wiring lead-out region. The second power supply connecting line is connected with the third sub-power supply line and the fourth sub-power supply line. In the bending region, the second power supply connecting line is located on a side of the display signal connecting line away from the first power supply connecting line. In some examples, the second power supply line may be a low-voltage power supply line VSS. However, the embodiments are not limited thereto.

In some exemplary embodiments, the first power supply line may be a high-voltage power supply line VDD. However, the embodiments are not limited thereto. For example, the first power supply line may be a low-voltage power supply line VSS.

In some exemplary embodiments, the wiring lead-out region includes a plurality of first display signal lines. The plurality of first display signal lines are divided into a first group of first display signal lines and a second group of first display signal lines; an orthographic projection of at least one first touch signal line on the base substrate is located between orthographic projections of the first group of first display signal lines and the second group of first display signal lines on the base substrate. However, the embodiments are not limited thereto.

In some exemplary embodiments, the plurality of first display signal lines in the wiring lead-out region includes at least one first data lead and at least one first drive control signal line. An orthographic projection of a first drive control signal line on the base substrate is adjacent to an orthographic projection of the first touch signal line on the base substrate. However, the embodiments are not limited thereto.

In some exemplary embodiments, the display structure layer includes at least one light emitting element. The light emitting element includes a first electrode, a second electrode, and an organic emitting layer located between the first electrode and the second electrode. The first electrode is located on a side of the second electrode close to the base substrate. The base substrate further includes a first border region located between the display region and the wiring lead-out region. The first border region is provided with a display control circuit and at least one second touch signal line. The second touch signal line is connected with the first touch signal line in the wiring lead-out region. Within the first border region, an orthographic projection of the second touch signal line on the base substrate is located within an orthographic projection of the second electrode on the base substrate. In this exemplary embodiment, in the first border region, the second electrode of the light emitting element is utilized to shield the second touch signal line, so that a signal interference between a display signal and a touch signal may be reduced, thereby improving display and touch effects.

In some embodiments, the signal access region is provided with a Touch and Display Driver Integration (TDDI) circuit. The TDDI circuit is connected with the first display signal line and the first touch signal line in the wiring lead-out region. In this exemplary embodiment, the TDDI circuit is adopted for display and touch drive control, which is beneficial for achieving lightness and thinness of the display panel, simplifying a preparation process of the display panel, reducing costs and improving performance of the display panel. However, the embodiments are not limited thereto.

Solutions of the embodiments will be described below by using a plurality of examples.

FIG. 1 is a schematic diagram of a display panel according to at least one embodiment of the present disclosure. In this exemplary embodiment, taking the display panel integrated with a self-capacitance touch structure to form an FSLOC structure as an example, the description will be made.

In some exemplary embodiments, as shown in FIG. 1, the display panel includes a display region 10, a first border region 22 surrounding the display region 10, and a second border region located on a side of the display region 10. The second border region includes a first wiring lead-out region 201, a bending region 202, a second wiring lead-out region 203, and a signal access region 23 disposed in sequence along a direction away from the display region 10 (i.e., a first direction DD. The first wiring lead-out region 201 is located on a side of the first border region 22 away from the display region 10. The first wiring lead-out region 201 is communicated with the first border region 22. The signal access region 23 is located on a side of the second wiring lead-out region 203 away from the display region 10. The signal access region 23 is communicated with the second wiring lead-out region 203. The signal access region 23 includes a circuit region 204 and a bonding pin region 205 which are in sequence disposed along a direction away from the display region 10 (i.e., the first direction D1).

In some exemplary embodiments, the bending region 202 is configured such that the second wiring lead-out region 203 and the signal access region 23 are bent to a back of the display region 10. The circuit region 204 is configured to dispose a corresponding integrated circuit. The bonding pin region 205 is configured to dispose a plurality of bonding pins which may be bound to a Flexible Printed Circuit (FPC) such that a plurality of signal leads (e.g., drive control lines and power supply lines) are connected with an external control apparatus through the plurality of bonding pins. In some examples, the integrated circuit disposed in the circuit region 204 may be a Touch and Display Driver Integration (TDDI) circuit. However, the embodiments are not limited thereto.

In some exemplary embodiments, as shown in FIG. 1, the display region 10 may be circle. However, the embodiments are not limited thereto. For example, the display region 10 may be rectangular or another shape such as oval.

In some exemplary embodiments, the display region 10 includes a display structure layer and a touch structure layer which are disposed on the base substrate in sequence. The display structure layer includes a plurality of display units (i.e., sub-pixels), a plurality of gate lines, and a plurality of data lines. Orthogonal projections of the plurality of gate lines and the plurality of data lines on the base substrate intersect to form a plurality of sub-pixel regions. One sub-pixel is disposed within one sub-pixel region. The plurality of data lines are electrically connected with the plurality of sub-pixels and configured to provide data signals for the sub-pixels. The plurality of gate lines are electrically connected with the plurality of sub-pixels and configured to provide gate driving signals for the plurality of sub-pixels.

In some examples, a pixel unit may include three sub-pixels, which are respectively a red sub-pixel, a green sub-pixel, and a blue sub-pixel. However, the embodiments are not limited thereto. In some examples, a pixel unit may include four sub-pixels, and the four sub-pixels may be a red sub-pixel, a green sub-pixel, a blue sub-pixel, and a white sub-pixel respectively. When the pixel unit includes three sub-pixels, the three sub-pixels may be arranged in a manner to stand side by side horizontally, in a manner to stand side by side vertically, or in a manner like a Chinese character "品". When the pixel unit includes four sub-pixels, the four sub-pixels may be arranged in a manner to stand side by side horizontally, in a manner to stand side by side vertically, or in a manner to form a square, which is not limited here in this embodiment.

In some exemplary embodiments, the touch structure includes a plurality of touch units. At least one touch unit may include at least one touch electrode. An orthographic projection of the at least one touch electrode on the base substrate may include orthographic projections of a plurality of sub-pixels on the base substrate. When a touch unit includes a plurality of touch electrodes, the plurality of touch electrodes may be disposed at intervals, and adjacent touch electrodes may be connected with each other through a connecting portion. A touch electrode may be of a same layer structure as the connecting portion. In some examples, the touch electrode may have a rhombus shape, such as a regular rhombus shape, a horizontally long rhombus shape, or a longitudinally long rhombus shape. However, the embodiments are not limited thereto. In some examples, the touch electrode may have any one or more of a triangle, a square, a trapezoid, a parallelogram, a pentagon, a hexagon, and another polygon.

Figure 2:
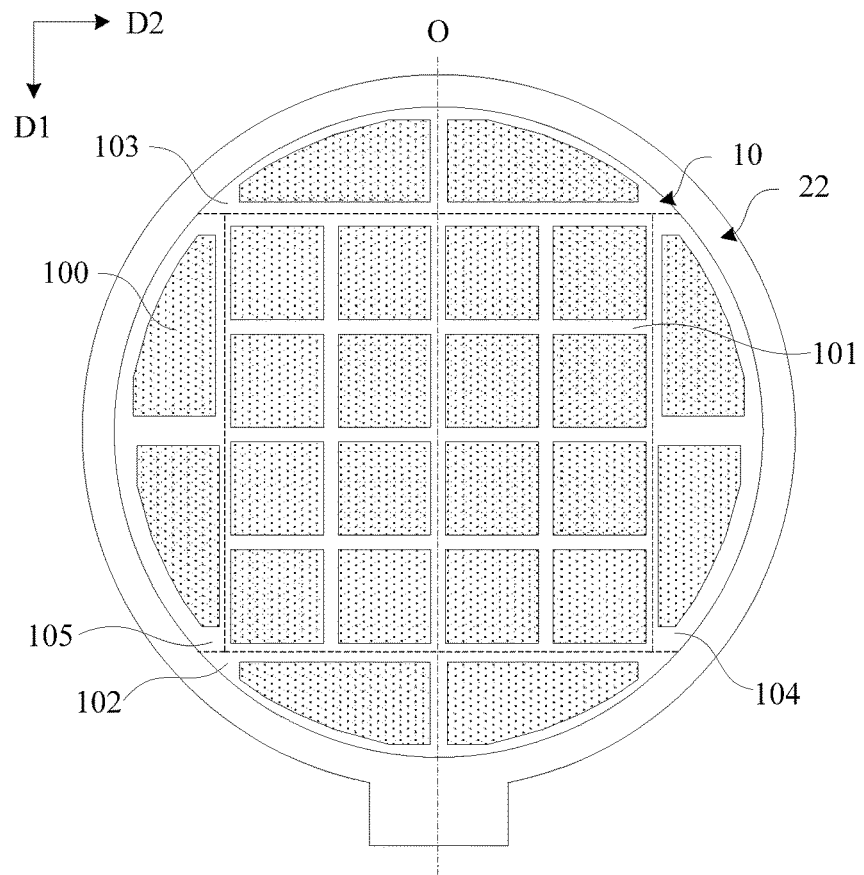
FIG. 2 is a schematic diagram of an arrangement of touch electrodes of a display panel according to at least one embodiment of the present disclosure.

FIG. 2 is a schematic diagram of an arrangement of touch electrodes of a display panel according to at least one embodiment of the present disclosure. In some exemplary embodiments, it is illustrated by taking a display region 10 including 24 self-capacitance touch electrodes as an example. As shown in FIG. 2, within a plane parallel to the display panel, the display region 10 may include 24 touch electrodes 100 arranged regularly. In some examples, a rectangular first electrode region 101 may include 4 rows*4 columns of touch electrodes 100 arranged in a matrix, a shape of each touch electrode 100 may be a rectangle, and areas of the 16 touch electrodes 100 may be the same. A second electrode region 102 and a third electrode region 103 in a shape of a circular crown may each include two touch electrodes 100, wherein the two touch electrodes 100 may be disposed in sequence along a second direction D2, areas of two touch electrodes 100 in each electrode region may be the same, and an area of a touch electrode 100 in the second electrode region 102 and an area of a touch electrode 100 in the third electrode region 103 may be the same. A fourth electrode region 104 and a fifth electrode region 105 in a shape of a circular crown may each include two touch electrodes 100, wherein the two touch electrodes 100 are disposed in sequence along the first direction D1, areas of two touch electrodes 100 in each electrode region may be the same, and an area of a touch electrode 100 in the fourth electrode region 104 and an area of a touch electrode 100 in the fifth electrode region 105 may be the same. In some examples, a plurality of touch electrodes 100 in the display region 10 may be disposed symmetrically with respect to a centerline O which may be a centerline extending along the first direction D1 and equally dividing the display region 10.

In some examples, a touch electrode in the display panel may be in a form of a metal mesh. The metal mesh is formed by interweaving a plurality of metal wires, and includes a plurality of mesh patterns. A mesh pattern is a polygon enclosed by a plurality of metal wires. The touch electrode in the form of the metal mesh has advantages of low resistance, small thickness, a quick response speed, etc. However, the embodiments are not limited thereto.

Figure 3:
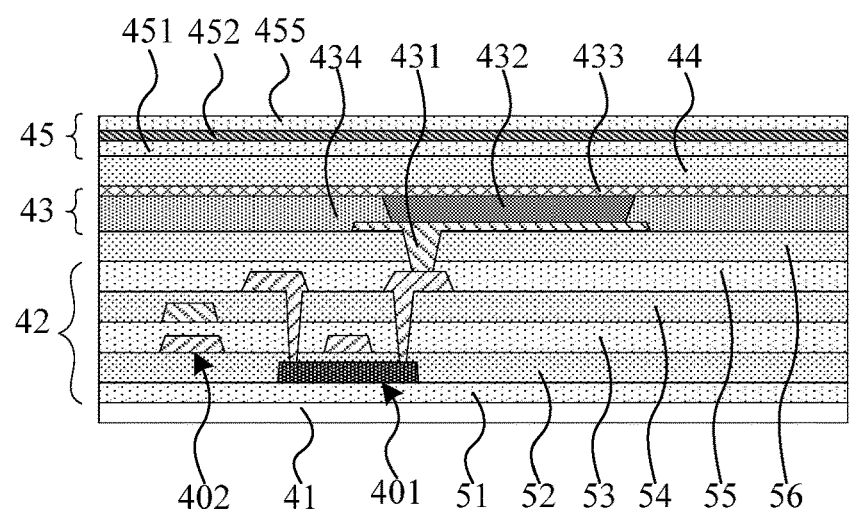
FIG. 3 is a schematic partial sectional view along an R-R direction in FIG. 1.

FIG. 3 is a schematic partial sectional view along an R-R direction in FIG. 1. In some exemplary embodiments, as shown in FIG. 3, within a plane perpendicular to the display panel, the display region 10 includes a base substrate 41, and a drive circuit layer 42, a light emitting element 43, an encapsulation layer 44, and a touch structure layer 45 which are disposed in sequence on the base substrate 41. FIG. 3 is illustrated by only taking a structure of one sub-pixel as an example.

In some exemplary embodiments, the base substrate 41 may be a flexible substrate. The flexible substrate may include a first flexible material layer, a first inorganic material layer, a semiconductor layer, a second flexible material layer, and a second inorganic material layer which are stacked. Among them, materials of the first flexible material layer and the second flexible material layer may be polyimide (PI), polyethylene terephthalate (PET), or a polymer soft film after a surface treatment, etc. Materials of the first inorganic material layer and the second inorganic material layer may be silicon nitride (SiNx), or silicon oxide (SiOx), etc., for improving water-resistance and oxygen-resistance capabilities of the base substrate; and a material of the semiconductor layer may be amorphous silicon (a-si). However, the embodiments are not limited thereto.

In some exemplary embodiments, the drive circuit layer 42 includes a plurality of transistors and at least one storage capacitor which form a pixel drive circuit. The pixel drive circuit may be designed for 2T1C (i.e., two thin film transistors and one capacitor), 3T1C (i.e., three thin film transistors and one capacitor), or 7T1C (i.e., seven thin film transistors and one capacitor). In FIG. 3, it is illustrated by taking one first transistor and one first storage capacitor as an example. The drive circuit layer 42 in the display region 10 may include a first insulation layer 51 disposed on a base substrate 41, an active layer disposed on the first insulation layer 51, a second insulation layer 52 covering the active layer, a first gate metal layer disposed on the second insulation layer 52, a third insulation layer 53 covering the first gate metal layer, a second gate metal layer disposed on the third insulation layer 53, a fourth insulation layer 54 covering the second gate metal layer, and a source-drain metal layer disposed on the fourth insulation layer 54. The active layer may at least include a first active layer. The first gate metal layer may at least include a first gate electrode and a first capacitor electrode. The second gate metal layer may at least include a second capacitor electrode. The source-drain metal layer may at least include a first source electrode and a first drain electrode. The first active layer, the first gate electrode, the first source electrode, and the first drain electrode form a first transistor 401, and the first capacitor electrode and the second capacitor electrode form a first storage capacitor 402.

In some exemplary embodiments, the light emitting element 43 may include a first electrode 431, a pixel definition layer 434, an organic emitting layer 432, and a second electrode 433. The first electrode 431 is disposed on a first planarization layer 56, and is connected with the first drain electrode of the first transistor 401 through a via provided on the first planarization layer 56 and a fifth insulation layer 55. The pixel definition layer 434 is disposed on the first electrode 431 and a first planarization layer 56, and a pixel opening is provided on the pixel definition layer 434, wherein the pixel opening exposes the first electrode 431. The organic emitting layer 432 is at least partially disposed in the pixel opening, and the organic emitting layer 432 is connected with the first electrode 431. The second electrode 433 is disposed on the organic emitting layer 432, and the second electrode 433 is connected with the organic emitting layer 432.

In some exemplary embodiments, the organic emitting layer 432 of the light emitting element 43 may include an Emitting Layer (EML), and include one or more film layers of a Hole Injection Layer (HIL), a Hole Transport Layer (HTL), a Hole Block Layer (HBL), an Electron Block Layer (EBL), an Electron Injection Layer (EIL), and an Electron Transport Layer (ETL). Under driving of voltages of the first electrode 431 and the second electrode 433, light is emitted according to a required gray scale by utilizing light emitting characteristics of an organic material.

In some exemplary embodiments, emitting layers of light emitting elements of different colors are different. For example, a red light emitting element includes a red emitting layer, a green light emitting element includes a green emitting layer, and a blue light emitting element includes a blue emitting layer. In order to reduce a process difficulty and improve a yield, a hole injection layer and a hole transport layer located on one side of an emitting layer may be a common layer, and an electron injection layer and an electron transport layer located on the other side of the emitting layer may be a common layer. In some examples, any one or more of the hole injection layer, the hole transport layer, the electron injection layer, and the electron transport layer may be made through one process (one evaporation process or one inkjet printing process), and isolated may be achieved through formed film layer surface segment differences, or through a surface treatment, etc. For example, any one or more of a hole injection layer, a hole transport layer, an electron injection layer, and an electron transport layer corresponding to adjacent sub-pixels may be isolated. In some examples, an organic emitting layer may be formed by using Fine Metal Mask (FMM) or Open Mask evaporation or by using an inkjet process.

In some exemplary embodiments, the encapsulation layer 44 may include a first encapsulation layer, a second encapsulation layer, and a third encapsulation layer which are stacked. Among them, the first encapsulation layer and the third encapsulation layer may be made of an inorganic material. The second encapsulation layer may be made of an organic material. The second encapsulation layer is disposed between the first encapsulation layer and the third encapsulation layer so as to ensure that external moisture cannot enter the light emitting element 43. However, the embodiments are not limited thereto. For example, an encapsulation layer may be of a five-layer stacked structure of inorganic/organic/inorganic/organic/inorganic.

In some exemplary embodiments, the touch structure layer 45 may include a first touch insulation layer 451 disposed on a side of the encapsulation layer 44 away from the base substrate 41, a touch electrode layer 452 disposed on a side of the first touch insulation layer 451 away from the base substrate 41, and a touch protective layer 455 disposed on a side of the touch electrode layer 452 away from the base substrate 41. However, the embodiments are not limited thereto.

Figure 4:
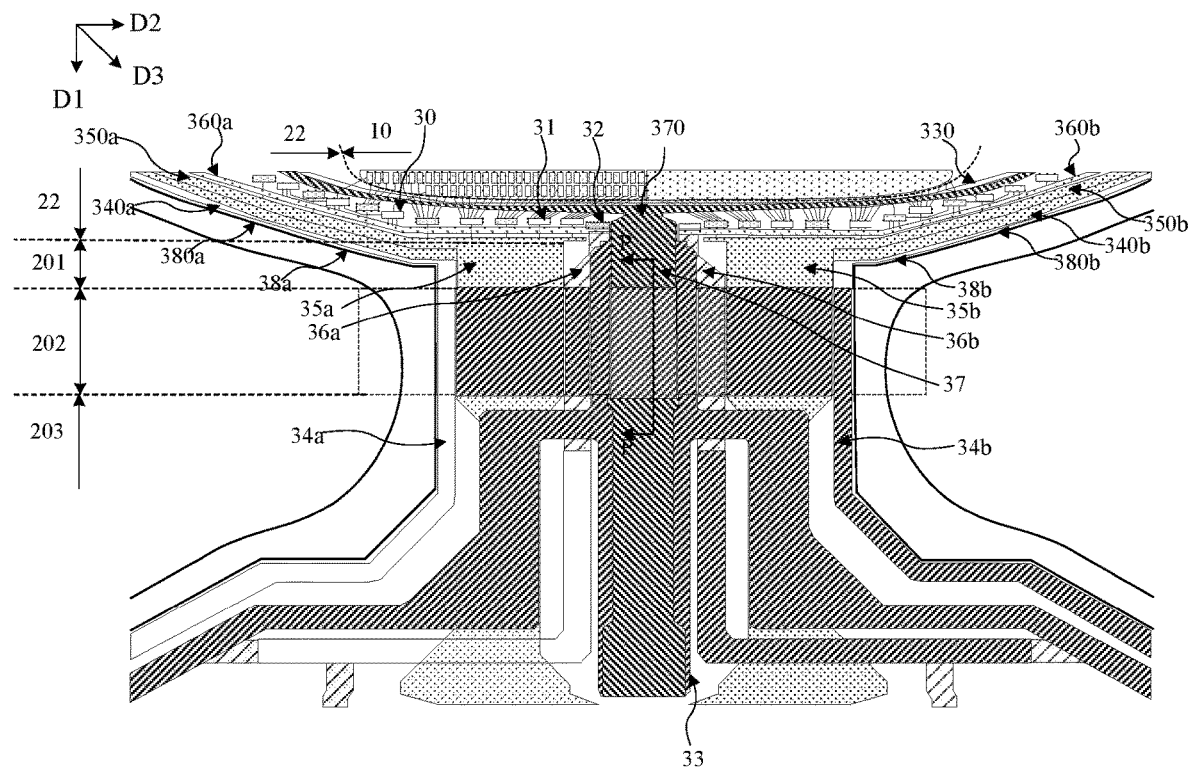
FIG. 4 is a partial schematic diagram of a region S1 in FIG. 1.
Figure 5:
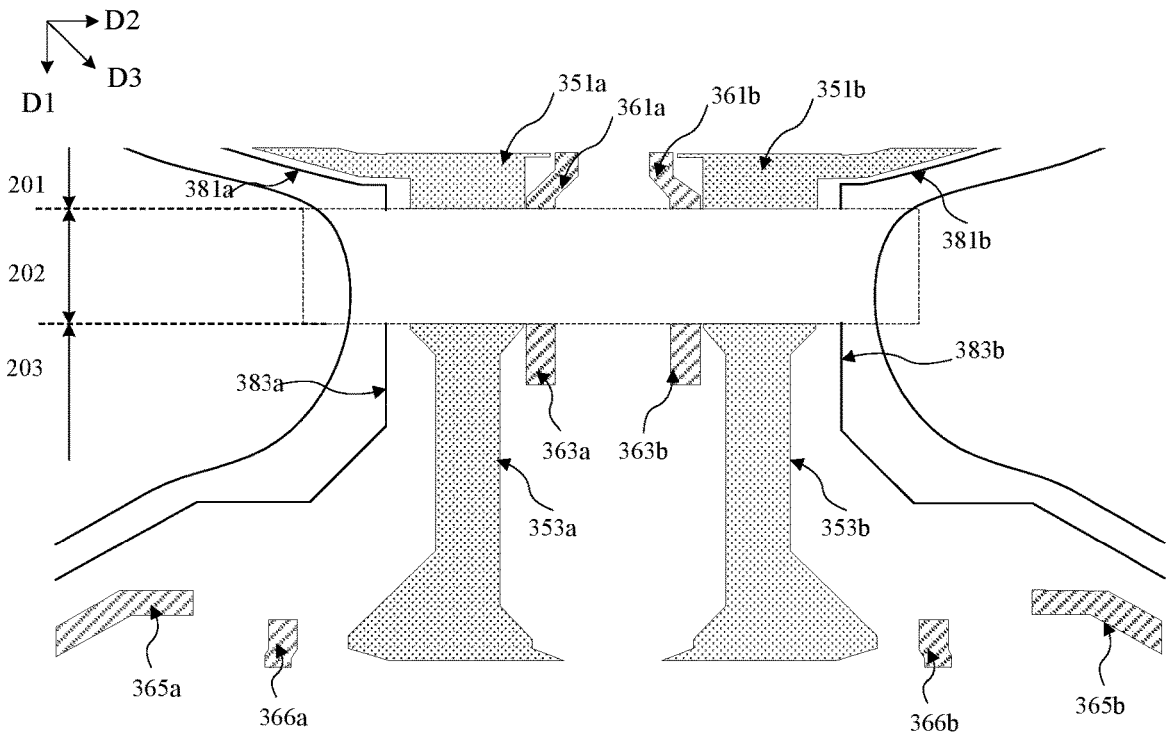
FIG. 5 is a schematic diagram of a wiring lead-out region after a second wiring layer is formed according to at least one embodiment of the present disclosure.
Figure 6A:
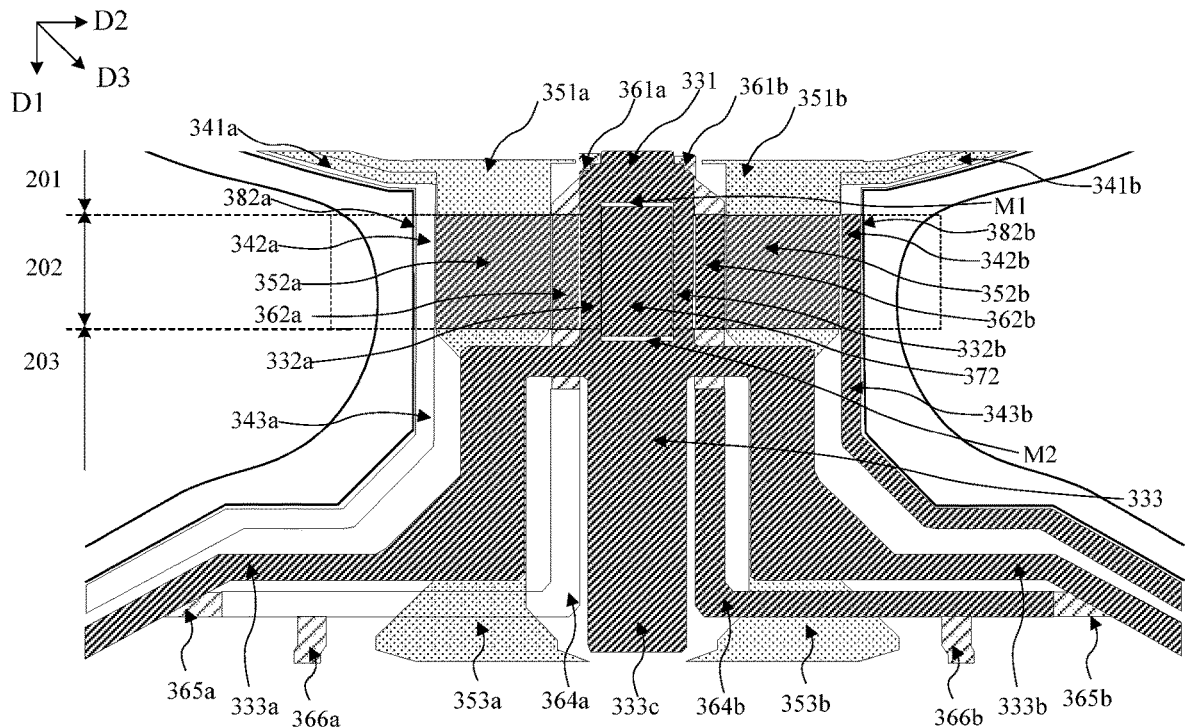
FIG. 6A is a schematic diagram of a wiring lead-out region and a bending region after a third wiring layer is formed according to at least one embodiment of the present disclosure.
Figure 6B:
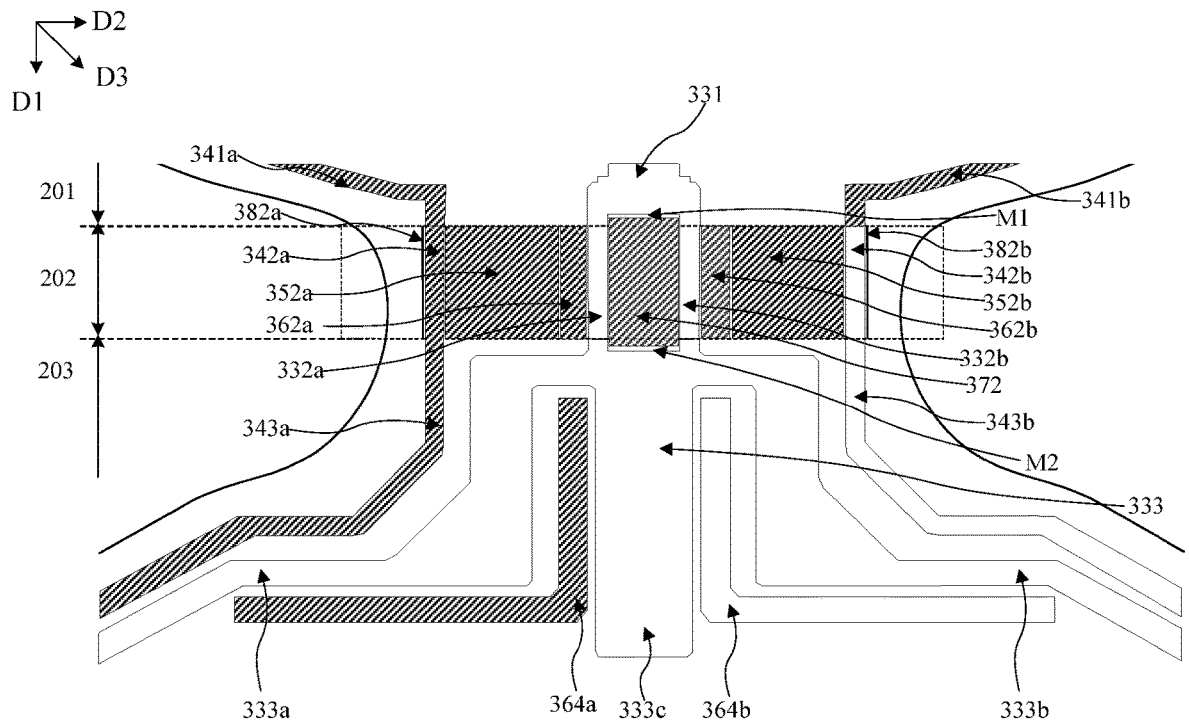
FIG. 6B is a schematic diagram of a third wiring layer formed in a wiring lead-out region and a bending region according to at least one embodiment of the present disclosure.
Figure 7A:
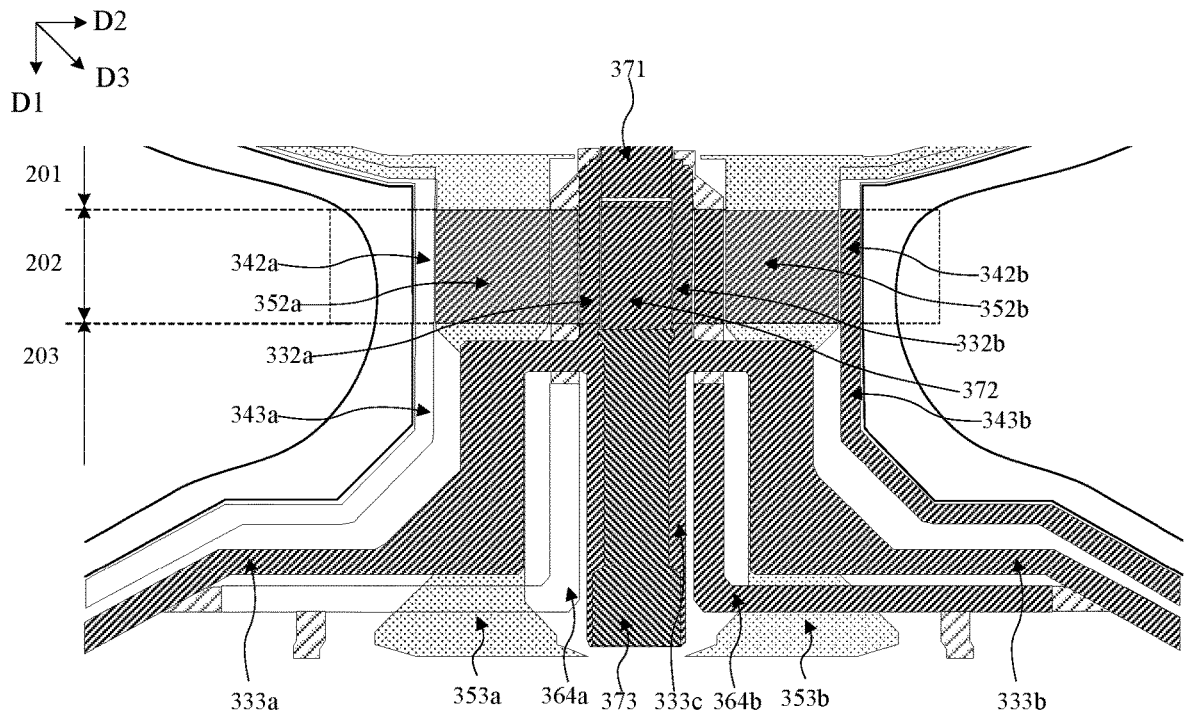
FIG. 7A is a schematic diagram of a wiring lead-out region after a touch signal line is formed according to at least one embodiment of the present disclosure.
Figure 7B:
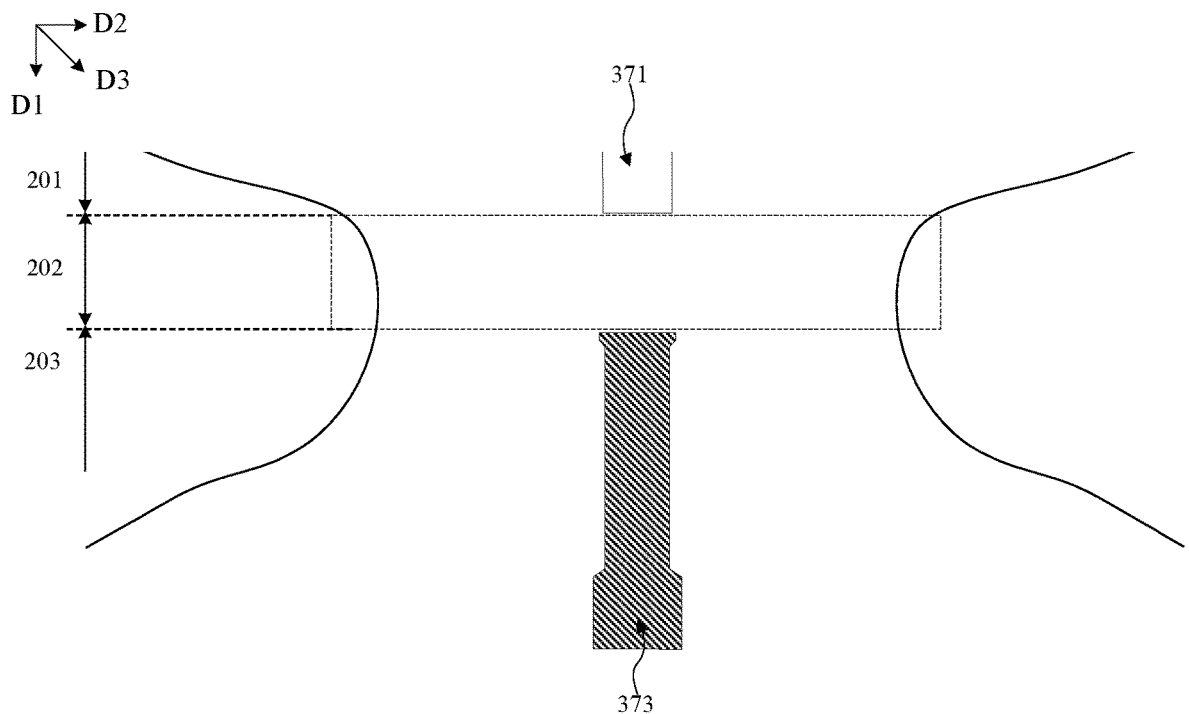
FIG. 7B is a schematic diagram of a touch signal line formed in a wiring lead-out region according to at least one embodiment of the present disclosure.
Figure 8:
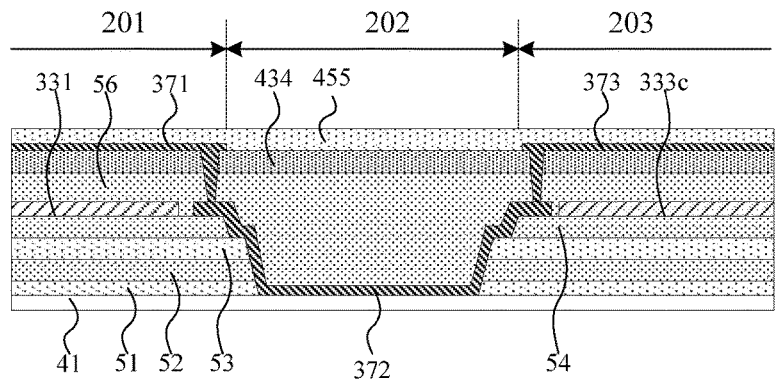
FIG. 8 is a schematic partial sectional view along a P-P direction in FIG. 4.

FIG. 4 is a partial schematic diagram of a region S1 in FIG. 1. FIG. 5 is a schematic diagram of a wiring lead-out region after a second wiring layer is formed according to at least one embodiment of the present disclosure. In this example, the wiring lead-out region includes a first wiring lead-out region 201 and a second wiring lead-out region 203. The second wiring layer of the wiring lead-out region is of a same layer structure as a second gate metal layer in the display region 10, and a first wiring layer of the wiring lead-out region is of a same layer as a first gate metal layer in the display region 10. FIG. 6A is a schematic diagram of a wiring lead-out region and a bending region after a third wiring layer is formed according to at least one embodiment of the present disclosure. FIG. 6B is a schematic diagram of a third wiring layer formed in a wiring lead-out region and a bending region according to at least one embodiment of the present disclosure. The third wiring layer in the wiring lead-out region and the bending region may be of a same layer structure as a source-drain metal layer in the display region 10. FIG. 7A is a schematic diagram of a wiring lead-out region after a touch signal line is formed according to at least one embodiment of the present disclosure. FIG. 7B is a schematic diagram of a touch signal line formed in a wiring lead-out region according to at least one embodiment of the present disclosure. In this example, the touch signal line may be of a same layer structure as a touch electrode layer in the display region 10. FIG. 8 is a schematic partial sectional view along a P-P direction in FIG. 4. In some examples, wirings of a lead-out region may be symmetrical with respect to a centerline O, and wirings of a bending region may be symmetrical with respect to the centerline O. However, the embodiments are not limited thereto.

In some exemplary embodiments, as shown in FIG. 4, the wiring lead-out region includes a first wiring lead-out region 201 and a second wiring lead-out region 203, and the bending region 202 is located between the first wiring lead-out region 201 and the second wiring lead-out region 203. The first wiring lead-out region 201 is located on a side of a first border region 22 away from the display region 10. A plurality of first display signal lines in the wiring lead-out region include a plurality of first data leads and a plurality of first drive control signal lines. A plurality of display signal connecting lines in the bending region 202 include a plurality of data connecting lines and a plurality of drive control connecting lines. In FIG. 4 to FIG. 7B, the plurality of first data leads, the plurality of first drive control signal lines, a plurality of first touch signal lines, the plurality of data connecting lines, the plurality of drive control connecting lines, and a plurality of touch signal connecting lines are shown as a whole, respectively. Quantities of the first data leads, the first drive control signal lines, the first touch signal lines, the data connecting lines, the drive control connecting lines, and the touch signal connecting lines are not limited in the embodiments.

In some exemplary embodiments, as shown in FIG. 4 and FIG. 5, at least one first data lead of the wiring lead region includes a first sub-data lead located in the first wiring lead-out region 201 and a second sub-data lead located in the second wiring lead-out region 203. The first sub-data lead and the second sub-data lead are connected through a data connecting line in the bending region 202. For example, a first data lead 35a includes a first sub-data lead 351a and a corresponding second sub-data lead 353a, and a first data lead 35b includes a first sub-data lead 351b and a corresponding second sub-data lead 353b. A data connecting line 352a in the bending region 202 is connected with the first sub-data lead 351a and the corresponding second sub-data lead 353a, and a data connecting line 352b is connected with the first sub-data lead 351b and the corresponding second sub-data lead 353b. The first sub-data lead 351a may extend to the first border region 22 to be connected with the second data lead 350a in the first border region 22; the first sub-data lead 351B may extend to the first border region 22 to be connected with the second data lead 350b in the first border region 22. In some examples, the first sub-data lead 351a and the corresponding connected second data lead 350a may be of an integrated structure, and the first sub-data lead 351b and the corresponding connected second data lead 350b may be of an integrated structure. The second sub-data lead 353a and the second sub-data lead 353b may extend to the circuit region 204 along the first direction D1, for example, to be connected with the TDDI circuit in the circuit region 204.

In some exemplary embodiments, as shown in FIG. 4, FIG. 5, and FIG. 6B, at least one first drive control signal line in the wiring lead-out region includes at least a first sub-drive control signal line located in the first wiring lead-out region 201, a second sub-drive control signal line located in the second wiring lead-out region 203, a third sub-drive control signal line, a fourth sub-drive control signal line, and a fifth sub-drive control signal line. The first sub-drive control signal line and the second sub-drive control signal line are connected through a drive control connecting line in the bending region 202. For example, a first drive control signal line 36a includes a first sub-driving signal line 361a, and a second sub-driving signal line 363a, a third sub-driving signal line 364a, a fourth sub-driving signal line 365a, and a fifth sub-driving signal line 366a which are connected in sequence. A second drive control signal line 36b includes a first sub-driving signal line 361b, and a second sub-driving signal line 363b, a third sub-driving signal line 364b, a fourth sub-driving signal line 365b, and a fifth sub-driving signal line 366b which are connected in sequence. A drive control connecting line 362a in the bending region 202 is connected with the first sub-driving signal line 361a and the second sub-driving signal line 363a. A drive control connecting line 362b in the bending region 202 is connected with the first sub-driving signal line 361b and the second sub-driving signal line 363b. First sub-driving signal lines 361a and 361b may be connected with second drive control signal lines 360a and 360b in the first border region 22 respectively and connected with an Electrostatic Discharge (ESD) circuit 32 within the first border region 22. Both second sub-driving signal lines 363a and 363b extend along the first direction D1. The third sub-driving signal line 364a is located on a right side of the second sub-data lead 353a and extends towards a side close to the second sub-data lead 353a along the first direction D1 and the second direction D2 in sequence to be connected with the fourth sub-driving signal line 365a and the fifth sub-driving signal line 366a. The third sub-driving signal line 364b is located on a left side of the second sub-data lead 353b and extends towards a side close to the second sub-data lead 353b along the first direction D1 and the second direction D2 in sequence to be connected with the fourth sub-driving signal line 365b and the fifth sub-driving signal line 366b. The fourth sub-driving signal line 365a is located on a left side of the second sub-data lead 353a and extends toward a side away from the second sub-data lead 353a along the second direction D2 and a third direction D3 in sequence. The fourth sub-driving signal line 365b is located on a right side of the second sub-data lead 353b and extends toward a side away from the second sub-data lead 353b along the second direction D2 and the third direction D3 in sequence. The third direction D3 intersects both the first direction D1 and the second direction D2. Fourth sub-driving signal lines 365a and 365b may extend to a bonding pin region and are connected with a bonding pin in the bonding pin region. Fifth sub-driving signal lines 366a and 366b may extend to a circuit region along the first direction D1, for example, to be connected with a TDDI circuit in the circuit region. However, the embodiments are not limited thereto.

In some exemplary embodiments, as shown in FIG. 4 and FIG. 7B, at least one first touch signal line in the wiring lead-out region includes a first sub-touch signal line located in the first wiring lead-out region 201 and a second sub-touch signal line located in the second wiring lead-out region 203. The first sub-touch signal line and the second sub-touch signal line are connected through a touch signal connecting line in the bending region 202. For example, at least one first touch signal line 37 includes a first sub-touch signal line 371 located in the first wiring lead-out region 201 and a second sub-touch signal line 373 located in the second wiring lead-out region 203. The first sub-touch signal line 371 and the second sub-touch signal line 373 are connected through a touch signal connecting line 372 in the bending region 202. The first sub-touch signal line 371 may be connected with a second touch signal line 370 in the first border region 22. The second sub-touch signal line 373 may extend to a circuit region along the first direction D1, for example, to be connected with a TDDI circuit in the circuit region. In some examples, the first touch signal line 37 and the second touch signal line 370 may be of an integrated structure. However, the embodiments are not limited thereto.

In some exemplary embodiments, as shown in FIG. 4 and FIG. 6B, a first power supply line 33 in the wiring lead-out region may include a first sub-power supply line 331 located in the first wiring lead-out region 201, and a second sub-power supply line 333 located in the second wiring lead-out region 203. The first sub-power supply line 331 may be connected with a third power supply line 330 within the first border region 22. The first sub-power supply line 331 and the second sub-power supply line 333 are connected through first power supply connecting lines 332a and 332b in the bending region 202. The first sub-power supply line 331 has a first notch M1 at an end close to the bending region 202. The end of the first sub-power supply line 331 having the first notch M1 is connected with the first power supply connecting lines 332a and 332b. The second sub-power supply line 333 has a first extension portion 333a, a second extension portion 333b, and a third extension portion 333c. The third extension portion 333c extends along the first direction D1. The third extension portion 333c has a second notch M2 at an end close to the bending region 202. The end of the third extension portion 333c having the second notch M2 is connected with the first power supply connecting lines 332a and 332b. The first extension portion 333a is located on a left side of the third extension portion 333c and extends toward a side away from the third extension portion 333c along the second direction D2, the first direction D1, the second direction D2, and the third direction D3 in sequence or along the second direction D2, the first direction D1, the third direction D3, the second direction D2, and the third direction D3 in sequence. The second extension portion 333b is located on a right side of the third extension portion 333c and extends toward a side away from the third extension portion 333c along the second direction D2, the first direction D1, the second direction D2, and the third direction D3 in sequence or along the second direction D2, the first direction D1, the third direction D3, the second direction D2, and the third direction D3 in sequence. The first extension portion 333a and the second extension portion 333b may extend to a bonding pin region to be connected with a bonding pin in the bonding pin region.

In some exemplary embodiments, as shown in FIG. 6B, the first sub-power supply line 331 and the second sub-power supply line 333 of the first power supply line 33, and the first power supply connecting lines 332a and 332b may be of an integrated structure. However, the embodiments are not limited thereto. For example, the first power supply connecting lines 332a and 332b may be of a different layer from the first sub-power supply line 331 and the second sub-power supply line 333.

In some exemplary embodiments, as shown in FIG. 4 and FIG. 6B, the second power supply line in the wiring lead-out region includes a third sub-power supply line located in the first wiring lead-out region 201, and a fourth sub-power supply line located in the second wiring lead-out region 203. The third sub-power supply line and the fourth sub-power supply line may be connected through the second power supply connecting line in the bending region. For example, a second power supply line 34a includes a third sub-power supply line 341a located in the first wiring lead-out region 201, and a fourth sub-power supply line 343a located in the second wiring lead-out region 203; a second power supply line 34b includes a third sub-power supply line 341b located in the first wiring lead-out region 201, and a fourth sub-power supply line 343b located in the second wiring lead-out region 203; and the second power supply connecting line 342a is connected with the third sub-power supply line 341a and the fourth sub-power supply line 343a, and the second power supply connecting line 342b is connected with the third sub-power supply line 341b and the fourth sub-power supply line 343b. Third sub-power supply lines 341a and 341b are connected with fourth power supply lines 340a and 340b in the first border region 22 respectively. The fourth sub-power supply line 343a is located on a left side of the second sub-power supply line 333 and extends towards a direction away from the second sub-power supply line 333 along the first direction D1, the third direction D3, the second direction D2, and the third direction D3 in sequence; the fourth sub-power supply line 343b is located on a right side of the second sub-power supply line 333 and extends towards a direction away from the second sub-power supply line 333 along the first direction D1, the third direction D3, the second direction D2, and the third direction D3 in sequence. The fourth sub-power supply lines 343a and 343b may extend to a bonding pin region to be connected with a bonding pin in the bonding pin region.

In some exemplary embodiments, as shown in FIG. 6B, the third sub-power supply line 341a, the second power supply connecting line 342a, and the fourth sub-power supply line 343a may be of an integrated structure, and the third sub-power supply line 341b, the second power supply connecting line 342b, and the fourth sub-power supply line 343b may be of an integrated structure. However, the embodiments are not limited thereto. For example, the second power supply connecting line may be of a different layer structure from the third sub-power supply line and fourth sub-power supply line.

In some exemplary embodiments, as shown in FIG. 4 and FIG. 5, a first Panel Crack Detect (PCD) signal line in the wiring lead-out region includes a first sub-PCD signal line located in the first wiring lead-out region 201 and a second sub-PCD signal line located in the second wiring lead-out region 203. The first sub-PCD signal line and the second sub-PCD signal line are connected through a PCD connecting signal line in the bending region 202. For example, a first PCD signal line 38a includes a first sub-PCD signal line 381a located in the first wiring lead-out region 201, and a second sub-PCD signal line 383a located in the second wiring lead-out region 203; a first PCD signal line 38b includes a first sub-PCD signal line 381b located in the first wiring lead-out region 201 and a second sub-PCD signal line 383b located in the second wiring lead-out region 203. A PCD connecting signal line 382a in the bending region 202 is connected with the first sub-PCD signal line 381a and the second sub-PCD signal line 383a, and a PCD connecting signal line 382b is connected with the first sub-PCD signal line 381b and the second sub-PCD signal line 383b. First sub-PCD signal lines 381a and 381b are connected with second PCD signal lines 380a and 380b in the first border region 22 respectively. Second sub-PCD signal lines 383a and 383b may extend to a bonding pin region to be connected with a bonding pin in the bonding pin region. In some examples, the first sub-PCD signal line 381a and the second PCD signal line 380a may be of an integrated structure, and the first sub-PCD signal line 381b and the second PCD signal line 380b may be of an integrated structure. However, the embodiments are not limited thereto.

In some exemplary embodiments, as shown in FIG. 1, a shape of the first border region 22 may be a ring surrounding the display region 10. As shown in FIG. 4, the first border region 22 is provided with a plurality of second touch signal lines 370. A first end of at least one second touch signal line 370 is connected with a touch unit in the display region 10, and a second end of the second touch signal line 370 extends along a border shape of the display region 10 and is connected with the first touch signal line 37 in the wiring lead-out region. For example, the second touch signal line 370 extends to be connected with the first sub-touch signal line 371 in the first wiring lead-out region 201. In some examples, the second touch signal line 370 and the first sub-touch signal line 371 may be of an integrated structure. However, the embodiments are not limited thereto.

In some exemplary embodiments, as shown in FIG. 4, the first border region 22 is further provided with a display control circuit, for example, including a gate drive circuit (such as Gate Driver on Array (GOA)) 30, a multiplexing circuit (MUX) 31, a test circuit (such as Cell Tester (CT)) (not shown in the figure), and an Electrostatic Discharge (ESD) circuit 32. In some examples, the gate drive circuit 30 may include a plurality of cascaded shift register units, each of which may be connected with at least one scanning signal line of the display region 10 and configured to provide a gate driving signal to at least one scanning signal line of the display region 10. A test circuit may include a plurality of test units, each of which may be connected with a plurality of data signal lines of the display region and configured to provide test data signals to the plurality of data signal lines of the display region. The multiplexing circuit 31 may include a plurality of multiplexing units, each of which may be connected with a plurality of data signal lines of the display region 10 and configured so that a signal source may provide data signals to the plurality of data signal lines. In some examples, the shift register units may be disposed at intervals from the multiplexing units. However, the embodiments are not limited thereto. The ESD Circuit 32 may include a plurality of electrostatic discharge units, for example, each of which may be connected with at least one second drive control signal line in the first border region 22 to eliminate static electricity on a signal line.

In some exemplary embodiments, as shown in FIG. 4, the border region 22 is provided with a plurality of second display signal lines, for example, including a plurality of second data leads and a plurality of second drive control signal lines. The second data leads may be connected with the multiplexing circuit 31. The plurality of second data leads include a first group of second data leads 350a and a second group of second data leads 350b. The first group of second data leads 350a extends from the first border region 22 on a left side of the display region 10 to the first border region 22 on a lower side and is connected with the first data lead 35a in the wiring lead-out region, for example, extending to the first wiring lead-out region 201 to be connected with the first sub-data lead 351a. The second group of second data leads 350b extends from the first border region 22 on a right side of the display region 10 to the first border region 22 on a lower side and is connected with the first data lead 35b in the wiring lead-out region, for example, extending to the first wiring lead-out region 201 to be connected with the first sub-data lead 351b. In this example, a second data lead and a correspondingly connected first data lead may be of an integrated structure. However, the embodiments are not limited thereto.

In some exemplary embodiments, as shown in FIG. 4, the plurality of second drive control signal lines within the first border region 22 include a first group of second drive control signal lines 360a and a second group of second drive control signal lines 360b. The first group of second drive control signal lines 360a extends from the first border region 22 on a left side of the display region 10 to the first border region 22 on a lower side and is connected with the ESD circuit 32 in the first border region 22 on the lower side, and is connected with a first drive control signal line in a wiring lead-out region, for example, connected with the first sub-drive control signal line 361a in the first wiring lead-out region 201. The second group of second drive control signal lines 360b extends from the first border region 22 on a right side of the display region 10 to the first border region 22 on a lower side and is connected with the ESD Circuit 32 in the first border region 22 on the lower side, and is connected with a first drive control signal line in a wiring lead-out region, for example, connected with the first sub-drive control signal line 361b in the first wiring lead-out region 201. In this example, a first drive control signal line may be of a different layer structure from a second drive control signal line. However, the embodiments are not limited thereto.

In some exemplary embodiments, as shown in FIG. 4, the first border region 22 is further provided with the third power supply line 330, the fourth power supply lines 340a and 340b. The third power supply line 330 within the first border region 22 on a left side and a right side of the display region 10 extends along a border shape of the display region 10 to the first border region 22 on a lower side of the display region 10, and converges together to extend to the wiring lead-out region to be connected with the first power supply line 33 in the wiring lead-out region. For example, the third power supply line 330 is connected with the first sub-power supply line 331 in the first wiring lead-out region 201. In this example, the third power supply line 330 and the first power supply line 33 may be of an integrated structure. The fourth power supply lines 340a and 340b are located on a side of the third power supply line 330 away from the display region 10 and extend to the wiring lead-out region to be respectively connected with the second power supply lines 34a and 34b in the wiring lead-out region. For example, the fourth power supply line 340a is connected with the fourth sub-power supply line 341a in the first wiring lead-out region 201, and the fourth power supply line 340b is connected with the fourth sub-power supply line 341b in the first wiring lead-out region 201. In this example, the fourth power supply line 340a and the second power supply line 34a may be of an integrated structure, and the fourth power supply line 340b and the second power supply line 34b may be of an integrated structure. However, the embodiments are not limited thereto.

In some exemplary embodiments, the first power supply line 33 and third power supply line 330 may be high-voltage power supply lines VDD. The second power supply lines 34a and 34b and the fourth power supply lines 340a and 340b may be low-voltage power supply lines VSS. A DC stabilization signal may be provided through a first power supply line, a second power supply line, a third power supply line, and a fourth power supply line. However, the embodiments are not limited thereto.

In some exemplary embodiments, as shown in FIG. 4, the first border region 22 is further provided with second PCD signal lines 380a and 380b. The second PCD signal line 380a is located on a side of the fourth power supply line 340a away from the display region 10, and the second PCD signal line 380b is located on a side of the fourth power supply line 340a away from the display region 10. The second PCD signal lines 380a and 380b extend to the wiring lead-out region to be respectively connected with the first PCD signal lines 38a and 38b in the wiring lead-out region. For example, the second PCD signal line 380a is connected with the first sub-PCD signal line 381a in the first wiring lead-out region 201, and the second PCD signal line 380b is connected with the first sub-PCD signal line 381b in the first wiring lead-out region 201. In this example, the second PCD signal line 380a and the first sub-PCD signal line 381a may be of an integrated structure, and the second PCD signal line 380*b* and the first sub-PCD signal line 381*b* may be of an integrated structure. However, the embodiments are not limited thereto.

In some exemplary embodiments, as shown in FIG. 4 to FIG. 7B, the first wiring lead-out region 201 is provided with a plurality of first sub-data leads 351*a* and 351*b*, a plurality of first sub-driving signal lines 361*a* and 361*b*, a first sub-power supply line 331, third sub-power supply lines 341*a* and 341*b*, a plurality of first sub-touch signal lines 371, and first sub-PCD signal lines 381*a* and 381*b*. Orthographic projections of the plurality of first sub-driving signal lines 361*a* and 361*b* on the base substrate are located in a middle of orthographic projections of the plurality of first sub-data leads 351*a* and the plurality of first sub-data leads 351*b* on the base substrate. Orthographic projections of the plurality of first sub-touch signal lines 371 on the base substrate are located in a middle of the orthographic projections of the plurality of first sub-driving signal lines 361*a* and 361*b* on the base substrate. The orthographic projections of the plurality of first sub-touch signal lines 371 on the base substrate are not overlapped with the orthographic projections of the plurality of first sub-data leads 351*a* and 351*b* and the plurality of first sub-driving signal lines 361*a* and 361*b* on the base substrate. An orthographic projection of the first sub-power supply line 331 on the base substrate is located in a middle of the orthographic projections of the plurality of first sub-data leads 351*a* and the plurality of first sub-data leads 351*b* on the base substrate, and is overlapped with the orthographic projections of the plurality of first sub-driving signal lines 361*a* and 361*b* on the base substrate. The orthographic projections of the plurality of first sub-touch signal lines 371 on the base substrate are overlapped with the orthographic projection of the first sub-power supply line 331 on the base substrate, wherein an orthographic projection of each first sub-touch signal line 371 on the base substrate is overlapped with the orthographic projection of the first sub-power supply line 331 on the base substrate. Within the first wiring lead-out region 201, a first sub-touch signal line may be isolated from a first sub-driving signal line and a first sub-data lead through the first sub-power supply line 331, avoiding mutual interference between a touch signal and a display signal and shielding signal jumps, thereby improving display and touch effects.

In some exemplary embodiments, as shown in FIG. 4 and FIG. 6A, within the first wiring lead-out region 201, an orthographic projection of the third sub-power supply line 341*a* on the base substrate is located on a side of an orthographic projection of a first sub-driving signal line 361*a* on the base substrate away from an orthographic projection of the first sub-power supply line 331 on the base substrate, and an orthographic projection of the third sub-power supply line 341*b* on the base substrate is located on a side of an orthographic projection of a first sub-driving signal line 361*b* on the base substrate away from the orthographic projection of the first sub-power supply line 331 on the base substrate. The first sub-PCD signal line 381*a* is located on a side of the third sub-power supply line 341*a* away from the first sub-power supply line 331, and the first sub-PCD signal line 381*b* is located on a side of the third sub-power supply line 341*b* away from the first sub-power supply line 331.

In some exemplary embodiments, as shown in FIG. 4 to FIG. 7B, within the first wiring lead-out region 201, a plurality of first sub-touch signal lines 371 are located on a side of the first sub-power supply line 331 away from the base substrate, and a plurality of first sub-data leads 351*a* and 351*b* and a plurality of first sub-driving signal lines 361*a* and 361*b* are located on a side of the first sub-power supply line 331 close to the base substrate. In some examples, the first sub-power supply line 331, and the third sub-power supply lines 341*a* and 341*b* are of a same layer structure, for example, being of a same layer structure as the source-drain metal layer in the display region 10. The plurality of first sub-touch signal lines 371 are of a same layer structure, for example, being of a same layer structure as the touch electrode layer of the display region 10. The plurality of first sub-driving signal lines 361*a* and 361*b* may be of a same layer structure, for example, being located in the first gate metal layer or in the second gate metal layer in the display region 10. The first sub-PCD signal lines 381*a* and 381*b* may be of a same layer structure as the first gate metal layer or the second gate metal layer in the display region 10. The plurality of first sub-data leads 351*a* and 351*b* may be of a different layer structure. For example, the plurality of first sub-data leads 351*a* and 351*b* are sequentially numbered. Odd-numbered first sub-data leads are of a same layer structure as the first gate metal layer in the display region 10, and even-numbered first sub-data leads are of a same layer structure as the second gate metal layer in the display region 10, or odd-numbered first sub-data leads are of a same layer structure as the second gate metal layer in the display region 10, and even-numbered first sub-data leads are of a same layer structure as the first gate metal layer in the display region 10. Orthographic projections of the plurality of first sub-data leads on the base substrate are not overlapped. By disposing the plurality of first sub-data leads in different layers, a distance between adjacent data leads may be reduced, and a transmission interference of adjacent data leads may be reduced, thereby improving signal transmission performance. However, the embodiments are not limited thereto. In some examples, the plurality of first sub-data leads may be disposed in a same layer. In some examples, at least one first sub-driving signal line may include a first sub-wiring and a second sub-wiring in parallel, the first sub-wiring may be of a same layer structure as the first gate metal layer in the display region, and the second sub-wiring may be of a same layer structure as the second gate metal layer in the display region.

In some exemplary embodiments, as shown in FIG. 4 to FIG. 7B, the bending region 202 is provided with a plurality of data connecting lines 352*a* and 352*b*, a plurality of drive control connecting lines 362*a* and 362*b*, a plurality of touch signal connecting lines 372, first power supply connecting lines 332*a* and 332*b*, second power supply connecting lines 342*a* and 342*b*, and PCD signal connecting lines 382*a* and 382*b*. A plurality of data connecting lines are connected with a plurality of first sub-data leads in a one-to-one correspondence, a plurality of drive control connecting lines are connected with a plurality of first sub-driving signal lines in a one-to-one correspondence, and a plurality of touch signal connecting lines are connected with a plurality of first sub-touch signal lines in a one-to-one correspondence. The first power supply connecting lines 332*a* and 332*b* are connected with the first sub-power supply line 331. A second power supply connecting line is connected with a corresponding third sub-power supply line.

In some exemplary embodiments, as shown in FIG. 6B, wirings within the bending region 202 all extend along the first direction D1 and are arranged side by side in sequence, and there is no electrical connection between adjacent wirings. The wirings within the bending region 202 are of a same layer structure, for example, being of a same layer structure as the source-drain metal layer in the display region 10.

In some exemplary embodiments, as shown in FIG. 6A and FIG. 6B, within the bending region 202, the PCD signal connecting line 382a, the second power supply connecting line 342a, the plurality of data connecting lines 352a, the plurality of drive control connecting lines 362a, the first power supply connecting line 332a, the touch signal connecting line 372, the first power supply connecting line 332b, the plurality of drive control connecting lines 362b, the plurality of data connecting lines 352b, the second power supply connecting line 342b, and the PCD signal connecting line 382b are arranged side by side in sequence along the second direction D2. In the exemplary embodiments, the first power supply connecting lines 332a and 332b are located between a drive control connecting line and a touch signal connecting line, so that isolation of a display signal and a touch signal may be achieved, a mutual interference between the touch signal and the display signal may be avoided, and signal jumps may be shielded, thereby improving display and touch effects.

In some exemplary embodiments, as shown in FIG. 4 to FIG. 6B, an orthographic projection of the touch signal connecting line 372 on the base substrate is not overlapped with orthographic projections of the first sub-power supply line 331 and the second sub-power supply line 333 on the base substrate. An overlapping region of orthographic projections of the first sub-touch signal line 371 and the touch signal connecting line 372 on the base substrate is located within an orthographic projection of the first notch M1 of the first sub-power supply line 331 on the base substrate. The first sub-touch signal line 371 is connected with the touch signal connecting line 372 through a via. An overlapping region of orthographic projections of the touch signal connecting line 372 and the second sub-touch signal line 373 on the base substrate is located within an orthographic projection of the second notch M2 of the third extension portion 333C of the second sub-power supply line 333 on the base substrate. The second sub-touch signal line 372 is connected with the touch signal connecting line 372 through a via. However, the embodiments are not limited thereto.

In some exemplary embodiments, as shown in FIG. 4 to FIG. 7B, the second wiring lead-out region 203 is provided with a plurality of second sub-data leads 353a and 353b, a plurality of second sub-driving signal lines 363a and 363b, a plurality of third sub-driving signal lines 364a and 364b, a plurality of fourth sub-driving signal lines 365a and 365b, a plurality of fifth sub-driving signal lines 366a and 366b, a plurality of second sub-touch signal lines 373, a second sub-power supply line 333, fourth sub-power supply lines 343a and 343b, and second sub-PCD signal lines 383a and 383b. Orthographic projections of the plurality of second sub-touch signal lines 373 on the base substrate are located in a middle of orthographic projections of the plurality of second sub-driving signal lines 363a and 363b on the base substrate, and are located in a middle of orthographic projections of the plurality of third sub-driving signal lines 364a and 364b on the base substrate. Orthographic projections of the plurality of third sub-touch signal lines 373 on the base substrate are not overlapped with any of orthographic projections of the second sub-data leads 353a and 353b or any of orthographic projections of the second sub-driving signal lines to the fifth sub-driving signal lines on the base substrate. The orthographic projections of the plurality of second sub-touch signal lines 373 on the base substrate are overlapped with an orthographic projection of the second sub-power supply line 333 on the base substrate, wherein an orthographic projection of each second sub-touch signal line 373 on the base substrate is overlapped with the orthographic projection of the second sub-power supply line 333 on the base substrate. For example, the orthographic projections of the plurality of second sub-touch signal lines 373 on the base substrate are overlapped with an orthographic projection of the third extension portion 333c of the second sub-power supply line 333 on the base substrate. In the exemplary embodiments, within the second wiring lead-out region 203, the second sub-touch signal line 373, second sub-data leads, and second to fifth sub-driving signal lines may be isolated through the third extension portion 333c of the second sub-power supply line 333, thereby avoiding a mutual interference between a touch signal and a display signal, shielding signal jumps, and improving display and touch effects.

In some exemplary embodiments, as shown in FIG. 5, FIG. 6B, and FIG. 7B, the second sub-driving signal lines 363a and 363b, the fourth sub-driving signal lines 365a and 365b, and the fifth sub-driving signal lines 366a and 366b may be of a same layer structure, for example, being of a same layer structure as the first gate metal layer or the second gate metal layer in the display region 10. For example, the third sub-driving signal lines 364a and 364b are of a same layer structure as the source-drain metal layer in the display region 10. The second sub-touch signal line 373 may be of a same layer structure as the touch electrode layer in the display region 10. The second sub-power supply lines 333 and the fourth sub-power supply lines 343a and 343b may be of a same layer structure as the source-drain metal layer in the display region 10. The second sub-PCD signal lines 383a and 383b may be of a same layer structure as the first gate metal layer or the second gate metal layer in the display region 10. However, the embodiments are not limited thereto.

In some exemplary embodiments, as shown in FIG. 4, FIG. 5, and FIG. 6B, an orthographic projection of the third sub-driving signal line 364a on the base substrate is overlapped with an orthographic projection of the second sub-data lead 353a on the base substrate, and an orthographic projection of the third sub-driving signal line 364b on the base substrate is overlapped with an orthographic projection of the second sub-data lead 353b on the base substrate. An orthographic projection of the fourth sub-driving signal line 365a on the base substrate is overlapped with an orthographic projection of the first extension portion 333a of the second sub-power supply line 333 on the base substrate, and an orthographic projection of the fourth sub-driving signal line 365b on the base substrate is overlapped with an orthographic projection of the second extension portion 333b of the second sub-power supply line 333 on the base substrate. The orthographic projection of the first extension portion 333a of the second sub-power supply line 333 on the base substrate is overlapped with the orthographic projection of the second sub-data lead 353a on the base substrate, and the orthographic projection of the second extension portion 333b of the second sub-power supply connecting line 333 on the base substrate is overlapped with the orthographic projection of the second sub-data lead 353b on the base substrate. The orthographic projection of the third extension portion 333c of the second sub-power supply connecting line 333 on the base substrate is located between orthographic projections of the third sub-driving signal lines 364a and 364b on the base substrate.

In some exemplary embodiments, an electrostatic discharge region may be disposed between the second wiring lead-out region 203 and the circuit region. An electrostatic discharge circuit may be disposed in the electrostatic discharge region, and the electrostatic discharge circuit may prevent electrostatic damage to the display panel by eliminating static electricity. For example, the electrostatic discharge circuit may be connected with a plurality of second sub-data leads. However, the embodiments are not limited thereto.

In some exemplary embodiments, as shown in FIG. 8, in a plane perpendicular to the display panel, the first wiring lead-out region 201 includes a base substrate 41, and a first insulation layer 51, a second insulation layer 52, a first wiring layer, a third insulation layer 53, a second wiring layer, a fourth insulation layer 54, a third wiring layer, a first planarization layer 56, a pixel definition layer 434, a touch signal line layer, and a touch protective layer 455 that are disposed on the base substrate 41 in sequence. In some examples, as shown in FIG. 4 to FIG. 7B, the first wiring layer at least includes a plurality of first sub-data leads 351a and 351b; the second wiring layer at least includes a plurality of first sub-data leads 351a and 351b, a plurality of first sub-driving signal lines 361a and 361b, and first sub-PCD signal lines 381a and 381b; the third wiring layer at least includes a first sub-power supply line 331, second sub-power supply lines 341a and 341b; and the touch signal line layer at least includes a plurality of first sub-touch signal lines 371. However, the embodiments are not limited thereto.

In some exemplary embodiments, as shown in FIG. 8, in a plane perpendicular to the display panel, the bending region 202 includes a base substrate 41, and a third wiring layer, a first planarization layer 56, a pixel definition layer 434, and a touch protective layer 455 that are disposed on the base substrate 41 in sequence. In some examples, as shown in FIG. 4 to FIG. 7B, the third wiring layer at least includes a plurality of data connecting lines 352a and 352b, a plurality of drive control connecting lines 361a and 361b, a plurality of touch signal connecting lines 372, first power supply connecting lines 332a and 332b, second power supply connecting lines 342a and 342b, and PCD signal connecting lines 382a and 382b. However, the embodiments are not limited thereto.

In some exemplary embodiments, as shown in FIG. 8, in a plane perpendicular to the display panel, the second wiring lead-out region 203 includes a base substrate 41, and a first insulation layer 51, a second insulation layer 52, a first wiring layer, a third insulation layer 53, a second wiring layer, a fourth insulation layer 54, a third wiring layer, a first planarization layer 56, a pixel definition layer 434, a touch signal line layer, and a touch protective layer 455 that are disposed on the base substrate 41 in sequence. In some examples, as shown in FIG. 4 to FIG. 7B, the first wiring layer at least includes a plurality of second sub-data leads 353a and 353b; the second wiring layer at least includes a plurality of second sub-data leads 353a and 353b, a plurality of second sub-driving signal lines 363a and 363b, a plurality of fourth sub-driving signal lines 365a and 365b, a plurality of fifth sub-driving signal lines 366a and 366b, and second sub-PCD signal lines 383a and 383b; the third wiring layer at least includes a second sub-power supply line 333, fourth sub-power supply lines 343a and 343b, a plurality of third sub-driving signal lines 364a and 364b; and the touch signal line layer at least includes a plurality of second sub-touch signal lines 373. However, the embodiments are not limited thereto.

Figure 9:
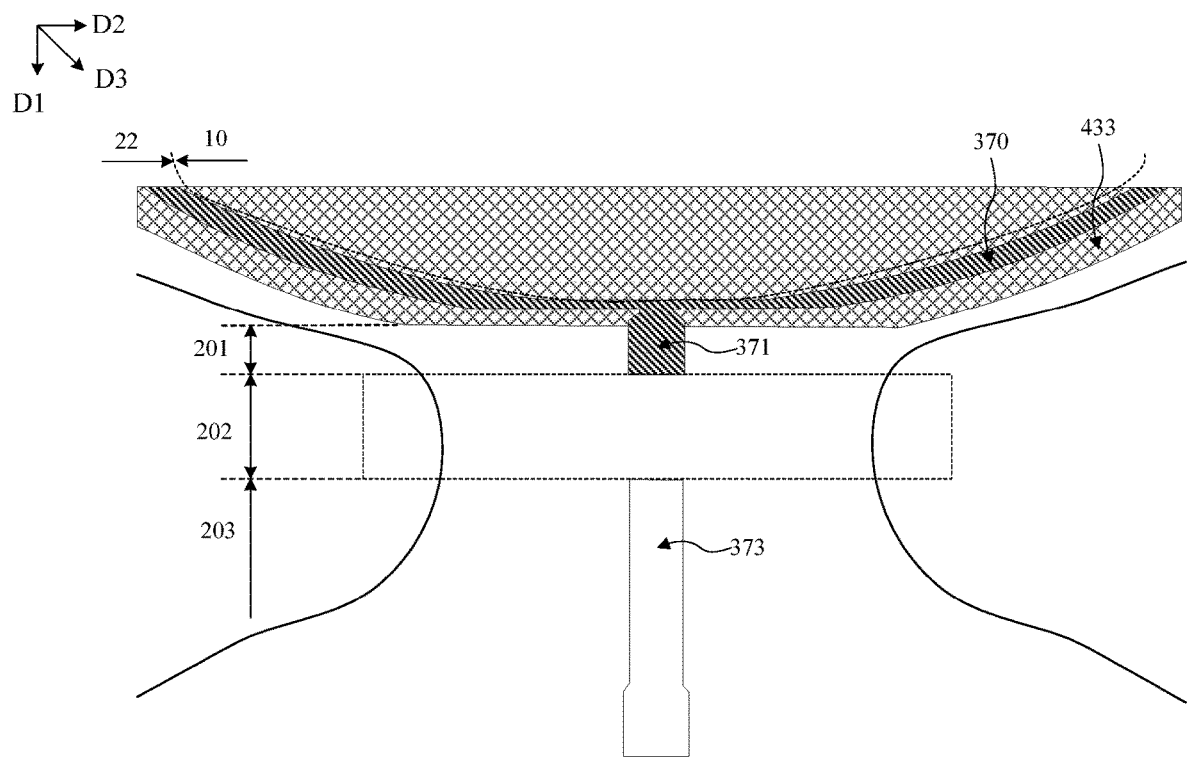
FIG. 9 is a schematic diagram of shielding a touch signal line by a second electrode according to at least one embodiment of the present disclosure.

FIG. 9 is a schematic diagram of shielding a touch signal line by a second electrode according to at least one embodiment of the present disclosure. As shown in FIG. 9, in some exemplary embodiments, second electrodes 433 of a plurality of sub-pixels in a display region 10 may be of an integrated structure. In some examples, a second electrode 433 is connected with a low-voltage power supply line. The second electrode 433 may extend from the display region 10 to a first border region 22. Orthographic projections of the plurality of second touch signal lines 370 in the first border region 22 on a base substrate are within an orthographic projection of the second electrode 433 on the base substrate. A second touch signal line 370 is connected with a first sub-touch signal line 371 in a first wiring lead-out region 201, for example, may be of an integrated structure. In the exemplary embodiments, by shielding a second touch signal line in a first border region through a second electrode, a mutual interference between a touch signal and a display signal in the first border region may be avoided, thereby improving display and touch effects.

In some exemplary embodiments, a second touch signal line is shielded in the first border region through a second electrode transmitting a low-voltage power supply signal and a first touch signal line is shielded in a wiring lead-out region through a first power supply line transmitting a high-voltage power signal, so that display and touch noises generated by a mutual interference between a touch signal and a display signal may be reduced, thereby improving display and touch effects.

Hereinafter, an exemplary description will be given through a preparation process of a display panel with reference to FIG. 3 to FIG. 8. A "patterning process" mentioned in the present disclosure includes coating with a photoresist, mask exposure, development, etching, photoresist stripping, and other treatments for a metal material, an inorganic material, or a transparent conductive material, and includes coating with an organic material, mask exposure, development, and other treatments for an organic material. Deposition may be any one or more of sputtering, evaporation, and chemical vapor deposition. Coating may be any one or more of spray coating, spin coating, and ink-jet printing. Etching may be any one or more of dry etching and wet etching, which is not limited in present disclosure. A "thin film" refers to a layer of thin film made of a material on a base substrate through a process such as depositing, coating, or the like. If the "thin film" does not need a patterning process in an entire preparation process, the "thin film" may also be called a "layer". If the "thin film" needs the patterning process in the entire preparation process, it is called a "thin film" before the patterning process, and called a "layer" after the patterning process. The "layer" obtained after the patterning process includes at least one "pattern".

"A and B are provided on a same layer" described in the present disclosure means that A and B are formed at the same time through a same patterning process, and a "thickness" of a film layer is a dimension of the film layer in a direction perpendicular to a display panel. In exemplary embodiments of the present disclosure, "an orthographic projection of A including an orthographic projection of B" or "an orthographic projection of B is located within a range of an orthographic projection of A" means that a boundary of the orthographic projection of B falls within a range of a boundary of the orthographic projection of A, or a boundary of the orthographic projection of A is overlapped with a boundary of the orthographic projection of B.

In an exemplary embodiment, a preparation process of the display panel may include following operations.

(1) A base substrate is prepared on a glass carrier plate.

In one exemplary embodiment, a base substrate 41 may be a flexible substrate, for example, including a first flexible material layer, a first inorganic material layer, a semiconductor layer, a second flexible material layer, and a second inorganic material layer which are stacked on a glass carrier plate. Materials of the first and second flexible material layers are materials such as polyimide (PI), polyethylene terephthalate (PET), or a surface-treated polymer soft film. Materials of the first inorganic material layer and the second inorganic material layer are materials such as silicon nitride (SiNx) or silicon oxide (SiOx), to improve water and oxygen resistance of the base substrate. The first inorganic material layer and the second inorganic material layer are also called Barrier layers. A material of the semiconductor layer is amorphous silicon (a-si).

In some exemplary embodiments, taking a stacked layer structure of a first flexible material layer/a first Barrier layer/a semiconductor layer/a second Barrier layer/a second flexible material layer as an example, the preparation process includes following acts: a layer of polyimide is coated on the glass carrier plate and is cured into a film to form a first flexible material layer; subsequently, a layer of barrier thin film is deposited on the first flexible material layer to form a first Barrier layer covering the first flexible material layer; then a layer of amorphous silicon thin film is deposited on the first Barrier layer to form an semiconductor layer covering the first Barrier layer; then a layer of polyimide is coated on the semiconductor layer and is cured into a film to form a second flexible material layer; then a layer of barrier thin film is deposited on the second flexible material layer to form a second Barrier layer covering the second flexible material layer, and preparation of the flexible base substrate 41 is thus finished, as shown in FIG. 3 and FIG. 8. After this process, all of the display region 10, the first wiring lead-out region 201, the bending region 202, and the second wiring lead-out region 203 include the base substrate 41.

(2) An active layer pattern is prepared on the base substrate.

In some exemplary embodiments, a first insulation thin film and an active layer thin film are sequentially deposited on the base substrate 41 and the active layer thin film is patterned through a patterning process to form a first insulation layer 51 covering the entire base substrate 41 and an active layer pattern on the first insulation layer 51. As shown in FIG. 3, the active layer pattern is formed in the display region 10 and at least includes a first active layer. After this process, the first wiring lead-out region 201, the bending region 202, and the second wiring lead-out region 203 include the first insulation layer 51 disposed on the base substrate 41.

(3) A first gate metal layer and a first wiring layer are prepared on the base substrate.

In some exemplary embodiments, a second insulation thin film and a first conductive thin film are sequentially deposited on the base substrate on which the aforementioned structures are formed, and the first conductive thin film is patterned through a patterning process to form a second insulation layer 52 covering an active layer, and a first gate metal layer and a first wiring layer pattern disposed on the second insulation layer 52. As shown in FIG. 3 and FIG. 5, the first gate metal layer is formed in the display region 10 and at least includes a first wiring layer, a first gate electrode, a first capacitor electrode, and a plurality of gate lines (not shown in the figures). The first wiring layer at least includes a plurality of first sub-data leads 351a and 351b and a plurality of second sub-data leads 353a and 353b formed in a wiring lead-out region.

(4) A second gate metal layer and a second wiring layer are prepared on the base substrate.

In some exemplary embodiments, a third insulation thin film and a second conductive thin film are sequentially deposited on the base substrate 41 on which the aforementioned structures are formed, and the second conductive thin film is patterned through a patterning process to form a third insulation layer 53, a second gate metal layer, and a second wiring layer. As shown in FIG. 3 and FIG. 5, the second gate metal layer at least includes: a second capacitor electrode formed in the display region 10, and the second wiring layer at least includes a plurality of first sub-data leads 351a and 352a, a plurality of second sub-data leads 353a and 353b, a plurality of first sub-driving signal lines 361a and 361b, a plurality of second sub-driving signal lines 363a and 363b, a plurality of fourth sub-driving signal lines 365a and 365b, a plurality of fifth sub-driving signal lines 366a and 366b, first sub-PCD signal lines 381a and 381b, and second sub-PCD signal lines 383a and 383b, which are formed in the wiring lead-out region.

In the exemplary embodiments, a plurality of first sub-data leads are alternately arranged on the first and second wiring layers, and a plurality of second sub-data leads are alternately arranged on the first and second wiring layers. By disposing the plurality of the first sub-data leads and the plurality of the second data leads in different layers, a distance between adjacent data leads may be reduced, and a transmission interference of adjacent data leads may be reduced, thereby improving signal transmission performance.

After this process, the bending region 202 includes the first insulation layer 51, the second insulation layer 52, and the third insulation layer 53 which are stacked on the base substrate 41.

(5) A fourth insulation layer is prepared on the base substrate.

In some exemplary embodiments, a fourth insulation thin film is deposited on the base substrate on which the aforementioned structures are formed. The fourth insulation thin film is patterned through a patterning process to form a fourth insulation layer 54. As shown in FIG. 3, At least two first vias are provided on the fourth insulation layer 54 in the display region 10. The fourth insulation layer 54, the third insulation layer 53, and the second insulation layer 53 in the two first vias are etched away to expose surfaces of both ends of the first active layer. A plurality of second vias and a plurality of third vias are provided on the fourth insulation layer 54 in the first wiring lead-out region 201. The fourth insulation layer 54 in the plurality of second vias is etched away to expose a surface of the second wiring layer, and the fourth insulation layer 54 and the third insulation layer 53 in the plurality of third vias are etched away to expose a surface of the first wiring layer.

After this process, the bending region 202 includes the first insulation layer 51, the second insulation layer 52, the third insulation layer 53, and the fourth insulation layer 54 which are stacked on the base substrate.

In some examples, a first groove and a second groove may be formed in the bending region 202 through two etching processes. The fourth insulation layer 54 in the bending region 202 is etched through a first mask (Etch Bending A MASK (EBA MASK)) to form the first groove so as to expose a surface of the third insulation layer 53. The third insulation layer 53, the second insulation layer 52, and the first insulation layer 51 in the first groove in the bending region 202 are etched through a second mask (Etch Bending B MASK (EBB MASK)) to expose a surface of the base substrate 41. In this example, by grooving the bending region 202 through EBA MASK and EBB MASK, a thickness of the bending region 202 may be reduced, and a bending effect may be improved.

After this process, a film layer structure of the display region 10 is not changed.

(6) A source-drain metal layer and a third wiring layer are prepared on the base substrate.

In some exemplary embodiments, a third conductive thin film is deposited on the base substrate on which the aforementioned structures are formed, and the third conductive thin film is patterned through a patterning process to form a source-drain layer and a third wiring layer. As shown in FIG. 3, FIG. 6A, and FIG. 6B, the source-drain metal layer at least includes a first source electrode, a first drain electrode, and a plurality of data lines which are formed in the display region 10. The third wiring layer at least includes a first sub-power supply line 331 and third sub-power supply lines 341*a* and 341*b* that are formed in the first wiring layer 201, first power supply connecting lines 332*a* and 332*b*, second power supply connecting lines 342*a* and 342*b*, a touch signal connecting line 372, data connecting lines 352*a* and 352*b*, drive control connecting lines 362*a* and 362*b*, and PCD signal connecting lines 382*a* and 382*b* that are formed in the bending region 202, a second sub-power supply line 333 and fourth sub-power supply lines 343*a* and 343*b* that are formed in the second wiring lead-out region 203. The first source electrode and the first drain electrode within the display region 10 are connected with the first active layer through the first via, respectively. Both ends of at least one data connecting line are respectively connected with a first sub-data lead in the first wiring lead-out region 201 and a second sub-data lead in the second wiring lead-out region through a second via. Both ends of at least one data connecting line are respectively connected with a first sub-data lead in the first wiring lead-out region 201 and a second sub-data lead in the second wiring lead-out region through a third via. At least one drive control connecting line is connected with a first sub-driving signal line in the first wiring lead-out region and a second sub-driving signal line in the second wiring lead-out region through a second via. A PCD signal connecting line is connected with a first sub-PCD signal line in the first wiring lead-out region and a second sub-PCD signal line in the second wiring lead-out region through a second via.

In some examples, the first sub-power supply line 331, the first power supply connecting lines 332*a* and 332*b*, and the second sub-power supply line 333 may be of an integrated structure. The third sub-power supply line 341*a*, the second power supply connecting line 342*a*, and the fourth sub-power supply line 343*a* may be of an integrated structure, and the third sub-power supply line 341*b*, the second power supply connecting line 342*b*, and the fourth sub-power supply line 343*b* may be of an integrated structure.

So far, preparation of the drive circuit layer in the display region is finished on the base substrate. As shown in FIG. 3, in the drive circuit layer in the display region 10, the first active layer, the first gate electrode, the first source electrode, and the first drain electrode constitute the first transistor 401, and the first capacitor electrode and the second capacitor electrode constitute the first storage capacitor 402.

In some exemplary embodiments, the first insulation layer 51, the second insulation layer 52, the third insulation layer 53, and the fourth insulation layer 54 may be made of any one or more of silicon oxide (SiOx), silicon nitride (SiNx), and silicon oxynitride (SiON), and may be a single layer, a multi-layer, or a composite layer. The first insulation layer 51 may be used for improving water and oxygen resistance of the base substrate 41. A first metal thin film, a second metal thin film, and a third metal thin film may be made of a metal material, such as any one or more of silver (Ag), copper (Cu), aluminum (Al), titanium (Ti), and molybdenum (Mo), or an alloy material of the above metals, such as aluminum-neodymium alloy (AlNd) or molybdenum-niobium alloy (MoNb), and may be a single-layer structure or a multi-layer composite structure, such as Ti/Al/Ti. For example, the first metal thin film and the second metal thin film may be made of metal Mo, and the third metal thin film may be made of Ti/Al/Ti. An active layer thin film may be made of one or more of materials such as amorphous indium gallium zinc oxide (a-IGZO), zinc oxynitride (ZnON), indium zinc tin oxide (IZTO), amorphous silicon (a-Si), polysilicon (p-Si), hexathiophene, and polythiophene. That is, the present disclosure is applicable to transistors that are manufactured based on an oxide technology, a silicon technology, and an organic technology.

(7) A fifth insulation layer and a first planarization layer are prepared on the base substrate.

In some exemplary embodiments, a fifth insulation thin film is deposited on the base substrate on which the aforementioned structures are formed to form a fifth insulation layer 55 through a patterning process, as shown in FIG. 3.

In some exemplary embodiments, a first planarization thin film is coated on the base substrate 41 on which the aforementioned structures are formed to form a first planarization layer 56 covering the entire base substrate 41.

After this process, the bending region 202 includes the base substrate 41, and the third wiring layer, and the first planarization layer 56 which are sequentially disposed on the base substrate 41.

(8) A light emitting element is prepared on the base substrate.

In some exemplary embodiments, on the base substrate on which the aforementioned structures are formed, a transparent conductive thin film is deposited on the base substrate 41 on which the aforementioned structures are formed, and the transparent conductive thin film is patterned through a patterning process to form a pattern of a first electrode 431. A pixel definition thin film is coated on the base substrate 41 on which the aforementioned structures are formed, and a pattern of a Pixel Definition Layer (PDL) 434 is formed through masking, exposure, and development processes. As shown in FIG. 3 and FIG. 8, the Pixel Definition Layer 434 is formed in the display region 10, the first wiring lead-out region 201, the bending region 202, and the second wiring lead-out region 203. A pixel opening is provided on the Pixel Definition Layer 434 in the display region 10. The pixel definition thin film in the pixel opening is removed by development to expose a surface of the first electrode 431. The first planarization layer 56 is covered by the Pixel Definition Layer 434 in the first wiring lead-out region 201, the bending region 202, and the second wiring lead-out region.

Subsequently, an organic emitting layer 432 and a second electrode 433 are sequentially formed on the base substrate 41 on which the aforementioned patterns are formed. As shown in FIG. 3, the organic emitting layer 432 may include a hole injection layer, a hole transmission layer, an emitting layer, an electron transmission layer, and an electron injection layer which are stacked, and is formed in a pixel opening of the display region 10 to achieve a connection between the organic emitting layer 432 and the first electrode 431. Since the first electrode 431 is connected with the first drain electrode of the first transistor 401, light emitting control of the organic emitting layer 432 is achieved. A portion of the second electrode 433 is formed on the organic emitting layer 432. After this patterning process, film layer structures of the first wiring lead-out region 201, the bending region 202, and the second wiring lead-out region 203 remain unchanged.

(9) An encapsulation layer is prepared.

In some exemplary embodiments, an encapsulation layer 44 is formed on the base substrate 41 on which the aforementioned patterns are formed. As shown in FIG. 3, the encapsulation layer 44 is formed in a display region 10, and may be made of a stacked layer structure of an inorganic material/an organic material/an inorganic material. An organic material layer is arranged between two inorganic material layers. After this patterning process, the film layer structures of the first wiring lead-out region 201, the bending region 202, and the second wiring lead-out region 203 remain unchanged.

(10) A touch structure layer is prepared.

In some exemplary embodiments, a first touch insulation material is deposited on the base substrate on which the aforementioned structures are formed and a first touch insulation (such as Touch Inner Layer Dielectric Layer (TLD)) layer 451 is formed by patterning a first touch insulation thin film through a patterning process. In some exemplary embodiments, first the first touch insulation layer 451 may be made of any one or more of silicon oxide (SiOx), silicon nitride (SiNx), and silicon oxynitride (SiON), and may be a single layer, a multi-layer, or a composite layer.

Then, a touch metal thin film is deposited, a pattern of a touch electrode layer 452 is formed on the first touch insulation layer 451 by patterning the metal thin film through a patterning process, and a touch signal line layer is formed in the first wiring lead-out region 201, the bending region 202, and the second wiring lead-out region 203. The pattern of the touch electrode layer 452 at least includes a touch electrode and a connecting portion located in the display region 10. In some examples, the touch electrode and the connecting portion may be in a form of a metal mesh. The touch signal line layer includes a second touch signal line located in the border region 22, a first sub-touch signal line located in the first wiring lead-out region 201, and a second sub-touch signal line located in the second wiring lead-out region. As shown in FIG. 8, the first sub-touch signal line 371 and the second sub-touch signal line 373 are respectively connected with the touch signal connecting line 372 through a fourth via provided on the pixel definition layer 434. The pixel definition layer 434 and the first planarization layer 56 in the fourth via are removed to expose a surface of the third wiring layer. In some exemplary embodiments, the touch metal thin film may be of a single-layer structure, such as any one or more of Argentum (Ag), Copper (Cu), Aluminum (Al), Titanium (Ti), and Molybdenum (Mo), or a stacked layer structure, such as Ti/Al/Ti.

Subsequently, a protective thin film is coated to form a touch protective layer 455 covering patterns of the touch electrode layer and the touch signal line layer. In an exemplary embodiment, the touch protective layer 455 may be made of polyimide (PI) or the like.

So far, preparation of the touch structure layer is finished.

In some exemplary embodiments, the first planarization layer and the pixel definition layer may be made of an organic material, such as polyimide, acrylic, or polyethylene terephthalate.

After preparation of the above film layer structures is finished, the display panel may be peeled off from the glass carrier plate through a peeling process.

The preparation process of this exemplary embodiment may be achieved by using an existing mature preparation device, which has slight improvement to existing processes, and may be well compatible with existing preparation processes. The processes are easy to realize, easy to implement, production efficiency is high, a production cost is low, and a yield is high.

The structure of the display panel of the exemplary embodiment and the preparation process thereof are described only as an example. In some exemplary embodiments, corresponding structures may be changed and patterning processes may be increased or decreased according to actual needs. For example, a display region may be provided with a first source-drain metal layer and a second source-drain metal layer, the first source-drain metal layer may include a first source electrode and a first drain electrode of a first transistor, and the second source-drain metal layer may include a connecting electrode configured to be connected with the first drain electrode and a first electrode of a light emitting element. Wirings in a bending region may be of a same layer structure as the first source-drain metal layer or the second source-drain metal layer in the display region. For another example, a first drive control signal line may be of a same layer structure as a first gate metal layer in the display region. However, the embodiments are not limited thereto.

The structure (or method) shown in this embodiment may be combined with structures (or methods) shown in other embodiments appropriately.

Figure 10:
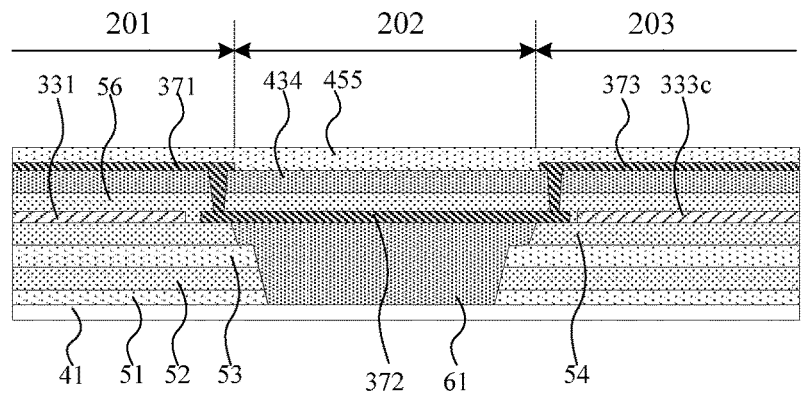
FIG. 10 is another schematic partial sectional view along a P-P direction in FIG. 4.

FIG. 10 is another schematic partial sectional view along a P-P direction in FIG. 4. In some exemplary embodiments, after the fourth insulation layer 54 is formed on the base substrate 41, a first groove and a second groove are formed in the bending region 202 through two etching processes, and an organic filling layer 61 is formed in the bending region 202. The organic filling layer 61 is located in the first groove and the second groove. Subsequently, a source-drain metal layer and a third wiring layer are prepared on the base substrate 41. The source-drain metal layer is located in the display region 10. The third wiring layer at least includes a first sub-power supply line 331 and third sub-power supply lines 341*a* and 341*b* that are formed in the first wiring lead-out region 201, first power supply connecting lines 332*a* and 332*b*, second power supply connecting lines 342*a* and 342*b*, a touch signal connecting line 372, data connecting lines 352*a* and 352*b*, drive control connecting lines 362*a* and 362*b*, and PCD signal connecting lines 382*a* and 382*b* that are formed in the bending region 202, and a second sub-power supply line 333 and fourth sub-power supply lines 343*a* and 343*b* that are formed in the second wiring lead-out region 203.

Regarding rest of the structure and the preparation process of the display panel of this embodiment, reference may be made to the descriptions of the aforementioned embodiments, and thus will not be repeated here. The structure (or method) shown in this embodiment may be combined with structures (or methods) shown in other embodiments appropriately.

Figure 11:
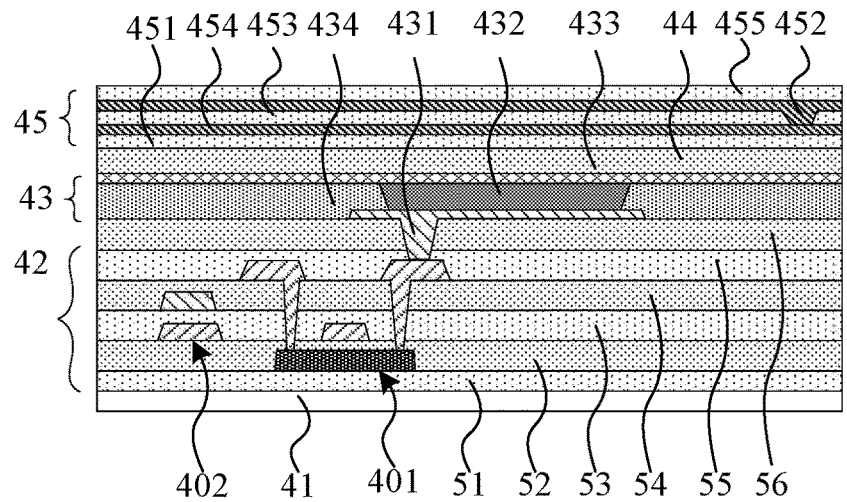
FIG. 11 is a schematic diagram of another structure of a display region of a display panel according to at least one embodiment of the present disclosure.
Figure 12:
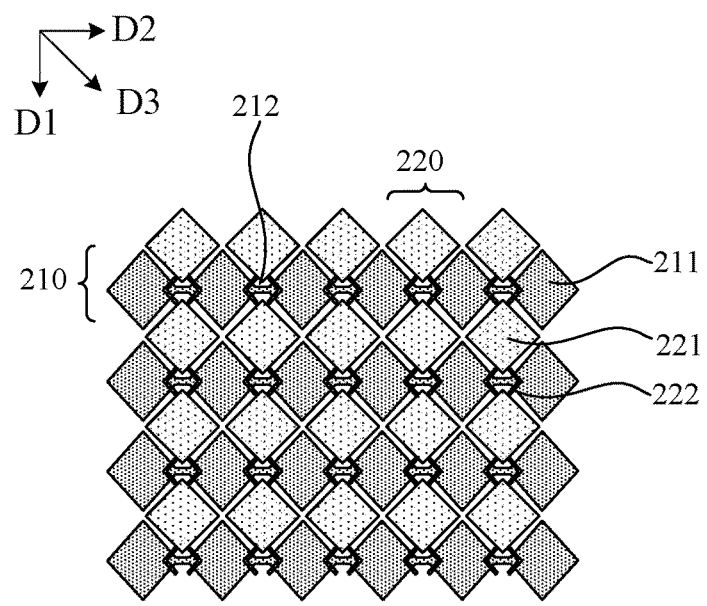
FIG. 12 is a schematic partial plan view of a touch structure layer of a display panel according to at least one embodiment of the present disclosure.

FIG. 11 is a schematic diagram of another structure of a display region of a display panel according to at least one embodiment of the present disclosure. FIG. 11 is a schematic partial sectional view along an R-R direction in FIG. 1. FIG. 12 is a schematic partial plan view of a touch structure layer of a display panel according to at least one embodiment of the present disclosure. In this exemplary embodiment, a case that the display panel is integrated with a mutual-capacitance touch structure to form an FMLOC structure is taken as an example for description.

In some exemplary embodiments, as shown in FIG. 12, the touch structure layer in the display region may include a plurality of first touch units 210 and a plurality of second touch units 220. The first touch units 210 have a line shape extending along a second direction D2 and the multiple first touch units 210 are arranged in sequence along a first direction D1. The second touch units 220 have a line shape extending along the first direction D1 and the multiple second touch units 220 are arranged in sequence along the second direction D2. Each first touch unit 210 includes multiple first touch electrodes 211 and first connecting portions 212 that are arranged in sequence along the second direction D2, and the first touch electrodes 211 and the first connecting portions 212 are alternately disposed and connected in sequence. Each second touch unit 220 includes multiple second touch electrodes 221 arranged in sequence along the first direction D1, and the multiple second touch electrodes 221 are disposed at intervals, and adjacent second touch electrodes 221 are connected with each other through second connecting portions 222. In an exemplary embodiment, a film layer where the second connecting portions 222 are located is different from a film layer where the first touch electrodes 211 and the second touch electrodes 221 are located. The first touch electrodes 211 and the second touch electrodes 221 are alternately arranged along a third direction D3, and the third direction D3 intersects with the first direction D1 and the second direction D2.

In some exemplary embodiments, the multiple first touch electrodes 211, the multiple second touch electrodes 221, and the multiple first connecting portions 212 may be disposed on a same layer, i.e., a touch layer, and may be formed through a same patterning process, and the first touch electrodes 211 and the first connecting portions 212 may be connected with each other to be of an integrated structure. The second connecting portions 222 may be disposed on a bridging layer, and adjacent second touch electrodes 221 are connected with each other through a via. A second touch insulation layer is disposed between a touch electrode layer and the bridging layer. In some possible embodiments, the multiple first touch electrodes 211, the multiple second touch electrodes 221, and the multiple second connecting portions 222 may be disposed on a same layer, i.e., the touch electrode layer, the second touch electrodes 221 and the second connecting portions 222 may be connected with each other to be of an integrated structure. The first connecting portions 212 may be disposed on the bridging layer and adjacent first touch electrodes 211 are connected with each other through a via. In an exemplary embodiment, the first touch electrodes may be driver (Tx) electrodes and the second touch electrodes may be sensor (Rx) electrodes. Or, the first touch electrodes may be sensor (Rx) electrodes and the second touch electrodes may be driver (Tx) electrodes.

In some exemplary embodiments, the first touch electrodes 211 and the second touch electrodes 221 may have rhombus shapes, such as regular rhombus shapes, horizontally longer rhombus shapes, or longitudinally longer rhombus shapes. In some possible embodiments, the first touch electrodes 211 and the second touch electrodes 221 may have any one or more of shapes of triangles, squares, trapezoids, parallelograms, pentagons, hexagons, and other polygons, which are not limited in the present disclosure.

In some exemplary embodiments, the first touch electrodes 211 and the second touch electrodes 221 may be in a form of transparent conductive electrodes. In an exemplary embodiment, the first touch electrodes 211 and the second touch electrodes 221 may be in a form of a metal mesh. The metal mesh is formed by multiple interweaving metal wires and includes multiple mesh patterns, wherein a mesh pattern is a polygon formed by multiple metal wires. The first touch electrodes 211 and the second touch electrodes 221 in the form of the metal mesh have advantages of small resistance, small thickness, fast response speed, and the like.

In some exemplary embodiments, as shown in FIG. 11, in a plane perpendicular to the base substrate, the touch structure layer 45 in the display region may include a first touch insulation layer 451, a bridging layer 454, a second touch insulation layer 453, a touch electrode layer 452, and a touch protective layer 455 that are sequentially disposed on an encapsulation layer 44. In this exemplary embodiment, structures of a first border region, a wiring lead-out region, and a bending region may be as describe in the aforementioned embodiments. Among them, a second touch signal line in the first border region and a first touch signal line in the wiring lead-out region may be of a same layer structure as the touch electrode layer or the bridging layer in the display region. However, the embodiments are not limited thereto.

Rest of the structure of the display panel in this exemplary embodiment is similar to a corresponding structure described in the aforementioned embodiments, and thus will not be repeated here. The structure (or method) shown in this embodiment may be combined with structures (or methods) shown in other embodiments appropriately.

Figure 13:
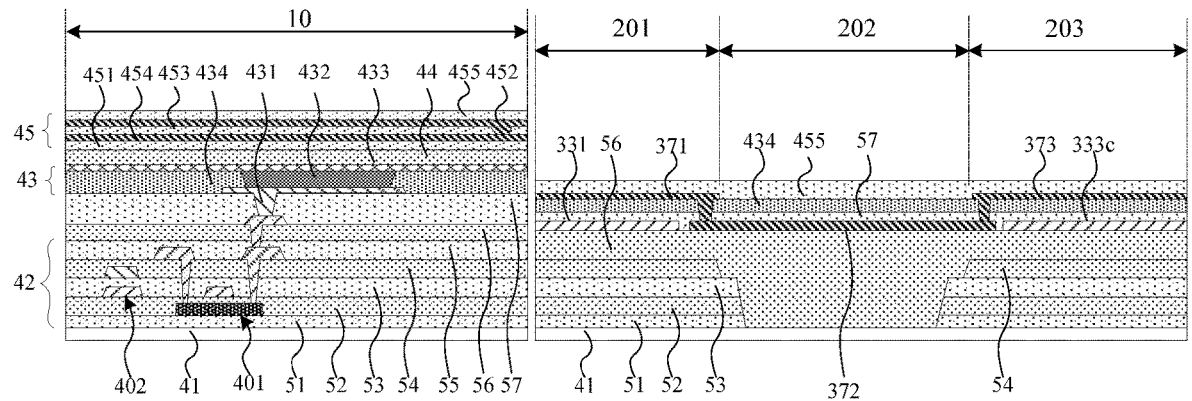
FIG. 13 is another schematic partial sectional view of a display panel according to at least one embodiment of the present disclosure.

FIG. 13 is a schematic diagram of another structure of a display panel according to at least one embodiment of the present disclosure. In some exemplary embodiments, in a plane perpendicular to a base substrate, as shown in FIG. 13, in a display region 10 includes a base substrate 41, and a drive circuit layer 42, a light emitting element 43, an encapsulation layer 44, and a touch structure layer 45 that are disposed in sequence on the base substrate 41. The drive circuit layer 42 may include a first insulation layer, an active layer, a second insulation layer, a first gate metal layer, a third insulation layer, a second gate metal layer, a fourth insulation layer, a first source-drain metal layer, a fifth insulation layer, a first planarization layer, a second source-drain metal layer, and a second planarization layer that are sequentially disposed on the base substrate 41. The first source-drain metal layer may at least include a first source electrode and a first drain electrode of a first transistor 401, and the second source-drain metal layer may at least include a connecting electrode which may connect the first drain electrode of the first transistor 401 and a first electrode 431 of the light emitting element 43.

In some exemplary embodiments, as shown in FIG. 13, a third wiring layer of a first wiring lead-out region 201, a bending region 202, and a second wiring lead-out region 203 may be of a same layer structure as the second source-drain metal layer in the display region 10. In some examples, the third wiring layer may include a first sub-power supply line 331 and third sub-power supply lines 341a and 341b in the first wiring lead-out region 201, all wirings in the bending region 202, and a second sub-power supply line 333 and fourth sub-power supply lines 343a and 343b in the second wiring lead-out region 203. However, the embodiments are not limited thereto. In some examples, a first power supply line and a second power supply line in a wiring lead-out region may be of a same layer structure as the first source-drain metal layer in the display region 10, and the wirings in the bending region 202 may be of a same layer structure as the second source-drain metal layer in the display region 10.

Or, the first power supply line and the second power supply line in the wiring lead-out region may be of a same layer structure as the second source-drain metal layer in the display region 10, and the wirings in the bending region 202 may be of a same layer structure as the first source-drain metal layer in the display region 10.

Rest of the structure of the display panel in this exemplary embodiment is similar to a corresponding structure described in the aforementioned embodiments, and thus will not be repeated here. The structure (or method) shown in this embodiment may be combined with structures (or methods) shown in other embodiments appropriately.

Figure 14:
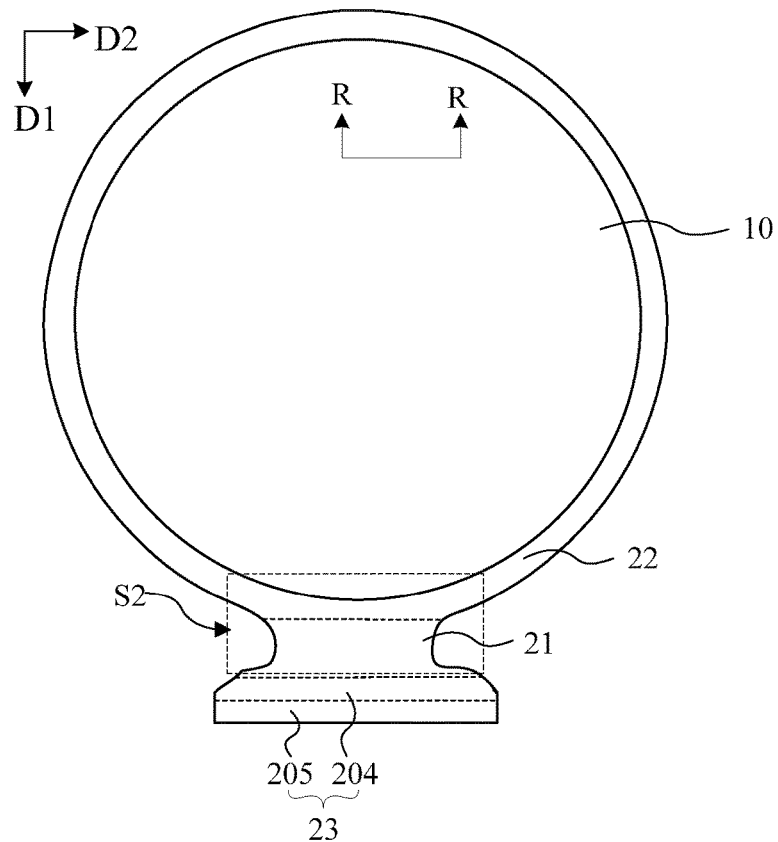
FIG. 14 is another schematic diagram of a display panel according to at least one embodiment of the present disclosure.
Figure 15:
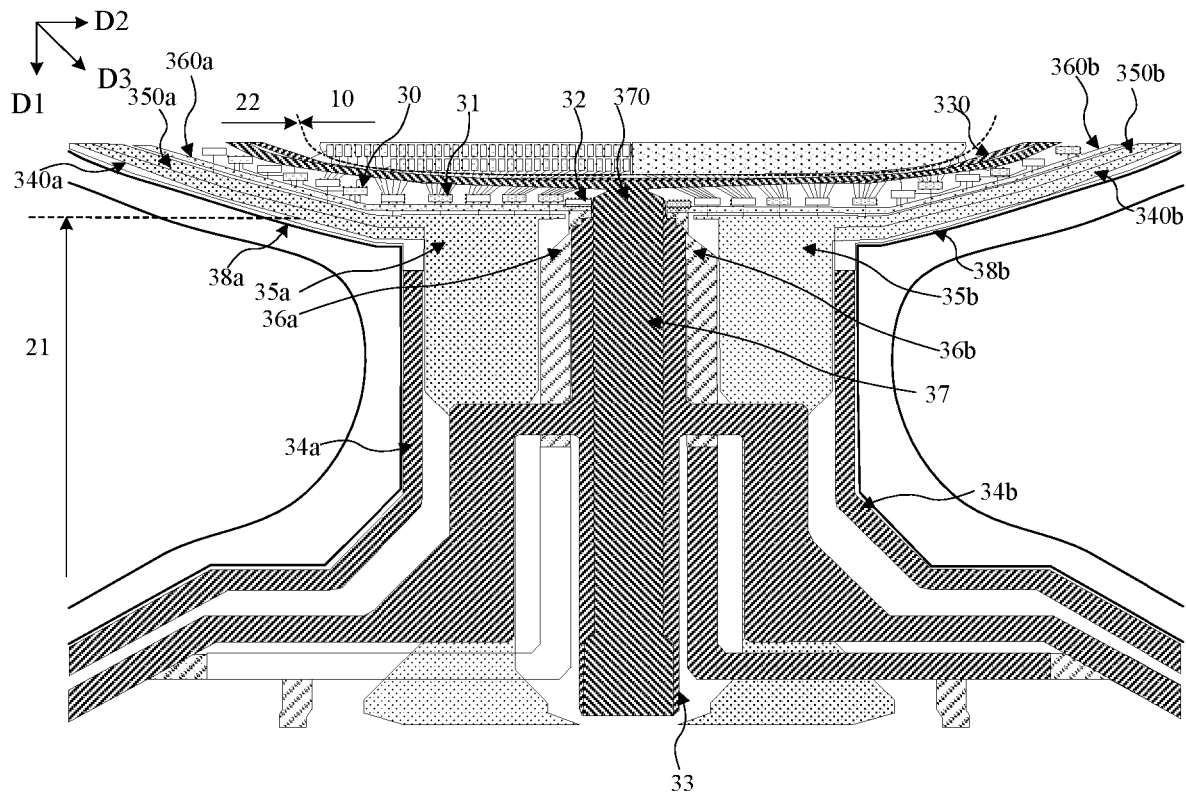
FIG. 15 is a partial schematic diagram of a region S2 in FIG. 14.

FIG. 14 is another schematic diagram of a display panel according to at least one embodiment of the present disclosure. FIG. 15 is a partial schematic diagram of a region S2 in FIG. 14. In some exemplary embodiments, as shown in FIG. 14 and FIG. 15, the display panel includes a display region 10, a first border region 22 surrounding the display region 10, and a second border region located on a side of the display region 10. The second border region includes a wiring lead-out region 21 and a signal access region 23 disposed in sequence along a direction away from the display region 10 (i.e., a first direction D1). The signal access region 23 is communicated with the wiring lead-out region 21. The signal access region 23 includes a circuit region 204 and a bonding pin region 205 that are sequentially disposed in a direction away from the display region 10 (i.e. the first direction D1).

In some exemplary embodiments, as shown in FIG. 15, the wiring lead-out region 21 includes a first power supply line 33, a plurality of first touch signal lines 37, a plurality of first data leads, and a plurality of first drive control signal lines that are disposed on a base substrate. The first power supply line 33 is connected with a third power supply line 330 in the first border region 22. A first touch signal line 37 is connected with a second touch signal line 370 in the first border region 22. A first data lead 35a is connected with a second data lead 350a in the first border region 22, and a first data lead 35b is connected with a second data lead 350b in the first border region 22. A first drive control signal line 36a is connected with a second drive control signal line 360a in the first border region 22, and a first drive control signal line 36b is connected with a second drive control signal line 360b in the first border region 22. The first power supply line 33 is connected with a third power supply line 330 in the first border region 22. A second power supply line 34a is connected with a fourth power supply line 340a in the first border region 22, and a second power supply line 34b is connected with a fourth power supply line 340b in the first border region 22.

In some exemplary embodiments, as shown in FIG. 15, the first data lead 35a and the second data lead 350a may be of an integrated structure, and the first data lead 35b and the second data lead 350b may be of an integrated structure. The first power supply line 33 and the third power supply line 330 may be of an integrated structure. The first touch signal line 37 and the second touch signal line 370 may be of an integrated structure. The second power supply line 34a and the fourth power supply line 340a may be of an integrated structure, and the second power supply line 34b and the fourth power supply line 340b may be of an integrated structure. The first drive control signal line 36a may be of a different layer structure from the second drive control signal line 360a in the first border region 22, and the first drive control signal line 36b may be of a different layer structure from the second drive control signal line 360b in the first border region 22. For example, the second drive control signal lines 360a and 360b may be of a same layer structure as a source-drain metal layer in the display region 10, and the first drive control signal lines 36a and 36b may be of a same layer structure as a first gate metal layer or a second gate metal layer in the display region 10. However, the embodiments are not limited thereto.

In some exemplary embodiments, as shown in FIG. 15, orthographic projections of the plurality of first touch signal lines 37 on the base substrate are not overlapped with orthographic projections of the plurality of first data leads and the plurality of first drive control signal lines on the base substrate. The orthographic projections of the plurality of first touch signal lines 37 on the base substrate are located within an orthographic projection of the first power supply line 33 on the base substrate. In the exemplary embodiment, a first touch signal line is isolated from a first data lead and a first drive control signal line by utilizing a first power supply line, thereby reducing a signal interference generated between a touch signal and a display signal, and improving display and touch effects.

Rest of the structure of the display panel in this exemplary embodiment is similar to a corresponding structure described in the aforementioned embodiments, and thus will not be repeated here. The structure (or method) shown in this embodiment may be combined with structures (or methods) shown in other embodiments appropriately.

At least one embodiment of the present disclosure further provides a preparation method of a display panel, which includes: a first power supply line, at least one first touch signal line, and at least one first display signal line are formed in a wiring lead-out region between a display region and a signal access region on a base substrate. A first touch signal line is located on a side of the first power supply line away from the base substrate, and a first display signal line is located on a side of the first power supply line close to the base substrate. An orthographic projection of the first touch signal line on the base substrate is at least partially overlapped with an orthographic projection of the first power supply on the base substrate.

Regarding the preparation method of the display panel in this embodiment, reference may be made to descriptions of the aforementioned embodiments, and thus will not be repeated here.

Figure 16:
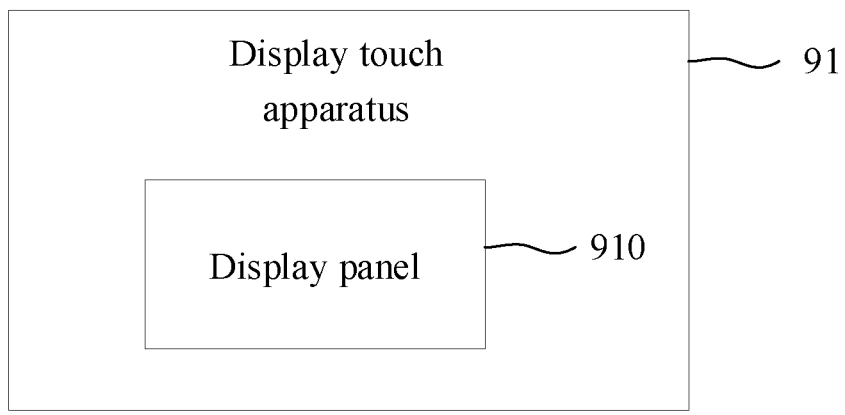
FIG. 16 is a schematic diagram of a display touch apparatus according to at least one embodiment of the present disclosure.

FIG. 16 is a schematic diagram of a display touch apparatus according to at least one embodiment of the present disclosure. As shown in FIG. 16, this embodiment provides a display touch apparatus 91 including a display panel 910 of the aforementioned embodiments. In some examples, the display panel 910 may be an OLED display panel with an integrated touch structure. The display touch apparatus 91 may be: any product or component with a display and touch function, such as a mobile phone, a tablet computer, a television, a display, a laptop, a digital photo frame, or a navigator. In some exemplary embodiments, the display touch apparatus 91 may be a wearable display apparatus, for example, which may be worn on a human body in some manners. For example, the display touch apparatus 91 may be a smart watch, a smart bracelet, and the like. However, the embodiments are not limited thereto.

The drawings of the present disclosure only involve the structures involved in the present disclosure, and other structures may refer to conventional designs. The embodiments in the present disclosure, i.e., features in the embodiments, may be combined with each other without conflict to obtain new embodiments. Those of ordinary skill in the art should understand that modifications or equivalent replacements may be made to the technical solutions of the present disclosure without departing from the spirit and scope of the technical solutions of the present disclosure, and shall all fall within the scope of the claims of the present disclosure.

The invention claimed is:

1. A display panel, comprising:
    a base substrate, comprising a display region, a wiring lead-out region and a signal access region located on a side of the display region, wherein the wiring lead-out region is located between the display region and the signal access region;
    a display structure layer, located in the display region;
    a touch structure layer, located in the display region and disposed on a side of the display structure layer away from the base substrate;
    at least one first power supply line, located in the wiring lead-out region and connected with the display structure layer;
    at least one first display signal line, located in the wiring lead-out region and connected with the display structure layer, and located on a side of the first power supply line close to the base substrate; and
    at least one first touch signal line, located in the wiring lead-out region and connected with the touch structure layer, and located on a side of the first power supply line away from the base substrate,
    wherein an orthographic projection of the first touch signal line on the base substrate is at least partially overlapped with an orthographic projection of the first power supply line on the base substrate,
    wherein the first touch signal line and the first power supply line are extended in a same direction;
    wherein the display structure layer comprises at least one light emitting element, and the light emitting element comprises: a first electrode, a second electrode, and an organic emitting layer located between the first electrode and the second electrode; the first electrode is located on a side of the second electrode close to the base substrate;
    wherein the base substrate further comprises: a first border region located between the display region and the wiring lead-out region; the first border region is provided with a display control circuit and at least one second touch signal line; the second touch signal line is connected with the first touch signal line in the wiring lead-out region; and
    wherein in the first border region, an orthographic projection of the second touch signal line on the base substrate is located within an orthographic projection of the second electrode on the base substrate.

2. The display panel according to claim 1, wherein the orthographic projection of the first touch signal line on the base substrate is not overlapped with an orthographic projection of the first display signal line on the base substrate.

3. The display panel according to claim 1, wherein the orthographic projection of the first touch signal line on the base substrate is located within the orthographic projection of the first power supply line on the base substrate.

4. The display panel according to claim 1, wherein the base substrate further comprises: a bending region,
    wherein the wiring lead-out region comprises: a first wiring lead-out region and a second wiring lead-out region disposed in sequence along a direction away from the display region; the bending region is located between the first wiring lead-out region and the second wiring lead-out region;
    the bending region comprises: at least one first power supply connecting line, at least one touch signal connecting line, and at least one display signal connecting line that are disposed on the base substrate; and
    the first power supply connecting line, the touch signal connecting line, and the display signal connecting line are of a same layer structure, and the first power supply connecting line is located between the touch signal connecting line and the display signal connecting line.

5. The display panel according to claim 4, wherein the first touch signal line in the wiring lead-out region comprises: a first sub-touch signal line located in the first wiring lead-out region, and a second sub-touch signal line located in the second wiring lead-out region;
    the first display signal line in the wiring lead-out region comprises: a first sub-display signal line located in the first wiring lead-out region and a second sub-display signal line located in the second wiring lead-out region;
    the touch signal connecting line is connected with the first sub-touch signal line and the second sub-touch signal line;
    the display signal connecting line is connected with the first sub-display signal line and the second sub-display signal line;
    the first sub-touch signal line and the second sub-touch signal line are located on a side of the touch signal connecting line away from the base substrate; and
    the first sub-display signal line and the second sub-display signal line are located on a side of the display signal connecting line close to the base substrate.

6. The display panel according to claim 4, wherein the first power supply line in the wiring lead-out region comprises: a first sub-power supply line located in the first wiring lead-out region and a second sub-power supply line located in the second wiring lead-out region;
    the first power supply connecting line is connected with the first sub-power supply line and the second sub-power supply line; and
    the first sub-power supply line, the first power supply connecting line, and the second sub-power supply line are of an integrated structure.

7. The display panel according to claim 4, wherein the first power supply connecting line, the touch signal connecting line, and the display signal connecting line in the bending region all extend along a first direction;
    in a second direction, at least one display signal connecting line, at least one first power supply connecting line, at least one touch signal connecting line, at least one first power supply connecting line, and at least one display signal connecting line are arranged in sequence in the bending region; and
    the first direction and the second direction are located in a same plane, and the first direction is perpendicular to the second direction.

8. The display panel according to claim 4, wherein the wiring lead-out region further comprises: at least one second power supply line; the bending region further comprises: at least one second power supply connecting line disposed on the base substrate;
    the second power supply line in the wiring lead-out region comprises: a third sub-power supply line located in the first wiring lead-out region and a fourth sub-power supply line located in the second wiring lead-out region;
    the second power supply connecting line is connected with the third sub-power supply line and the fourth sub-power supply line; and in the bending region, the second power supply connecting line is located on a side of the display signal connecting line away from the first power supply connecting line.

9. The display panel according to claim 1, wherein the wiring lead-out region comprises: a plurality of first display signal lines; and wherein the plurality of first display signal lines are divided into a first group of first display signal lines and a second group of first display signal lines; and an orthographic projection of at least one first touch signal line on the base substrate is located between orthographic projections of the first group of first display signal lines and the second group of first display signal lines on the base substrate.

10. The display panel according to claim 9, wherein the plurality of first display signal lines in the wiring lead-out region comprises: at least one first data lead, and at least one first drive control signal line; and an orthographic projection of the first drive control signal line on the base substrate is adjacent to an orthographic projection of the first touch signal line on the base substrate.

11. The display panel according to claim 1, wherein the first power supply line is a high-voltage power supply line.

12. The display panel according to claim 1, wherein the signal access region is provided with a Touch and Display Driver Integration (TDDI) circuit; and the TDDI circuit is connected with the first display signal line and the first touch signal line in the wiring lead-out region.

13. A display touch apparatus, comprising the display panel according to claim 1.

14. A preparation method for a display panel, comprising:
forming a display structure layer and a touch structure layer in sequence in a display region of a base substrate, and forming at least one first power supply line, at least one first touch signal line, and at least one first display signal line in a wiring lead-out region between the display region and a signal access region of the base substrate, wherein, the first power supply line and the first display signal line are connected with the display structure layer, and the first touch signal line is connected with the touch structure layer; the first touch signal line is located on a side of the first power supply line away from the base substrate, and the first display signal line is located on a side of the first power supply line close to the base substrate; and an orthographic projection of the first touch signal line on the base substrate is at least partially overlapped with an orthographic projection of the first power supply line on the base substrate, wherein the first touch signal line and the first power supply line are extended in a same direction;

wherein the display structure layer comprises at least one light emitting element, and the light emitting element comprises: a first electrode, a second electrode, and an organic emitting layer located between the first electrode and the second electrode; the first electrode is located on a side of the second electrode close to the base substrate;

the base substrate further comprises: a first border region located between the display region and the wiring lead-out region; the first border region is provided with a display control circuit and at least one second touch signal line; the second touch signal line is connected with the first touch signal line in the wiring lead-out region; and in the first border region, an orthographic projection of the second touch signal line on the base substrate is located within an orthographic projection of the second electrode on the base substrate.

15. The display panel according to claim 5, wherein the first power supply line in the wiring lead-out region comprises: a first sub-power supply line located in the first wiring lead-out region and a second sub-power supply line located in the second wiring lead-out region;
the first power supply connecting line is connected with the first sub-power supply line and the second sub-power supply line; and
the first sub-power supply line, the first power supply connecting line, and the second sub-power supply line are of an integrated structure.

16. The display panel according to claim 5, wherein the first power supply connecting line, the touch signal connecting line, and the display signal connecting line in the bending region all extend along a first direction;
in a second direction, at least one display signal connecting line, at least one first power supply connecting line, at least one touch signal connecting line, at least one first power supply connecting line, and at least one display signal connecting line are arranged in sequence in the bending region; and
the first direction and the second direction are located in a same plane, and the first direction is perpendicular to the second direction.

17. The display panel according to claim 5, wherein the display structure layer at least comprises: a drive circuit layer disposed on the base substrate; the drive circuit layer at least comprises: an active layer, a first gate metal layer, a second gate metal layer, and a source-drain metal layer that are disposed on the base substrate;
the first power supply connecting line, the touch signal connecting line, and the display signal connecting line in the bending region are of a same layer structure as the source-drain metal layer in the display region;
the at least one first display signal line in the wiring lead-out region is of a same layer structure as the first gate metal layer or the second gate metal layer in the display region;
the touch structure layer at least comprises a touch electrode layer;
the at least one first touch signal line in the wiring lead-out region is of a same layer structure as the touch electrode layer in the display region; and
the first power supply line in the wiring lead-out region is of a same layer structure as the source-drain metal layer in the display region.

18. The display panel according to claim 5, wherein the wiring lead-out region further comprises: at least one second power supply line; the bending region further comprises: at least one second power supply connecting line disposed on the base substrate;
the second power supply line in the wiring lead-out region comprises: a third sub-power supply line located in the first wiring lead-out region and a fourth sub-power supply line located in the second wiring lead-out region;
the second power supply connecting line is connected with the third sub-power supply line and the fourth sub-power supply line; and
in the bending region, the second power supply connecting line is located on a side of the display signal connecting line away from the first power supply connecting line.

19. A display panel, comprising:

a base substrate, comprising a display region, a wiring lead-out region and a signal access region located on a side of the display region, wherein the wiring lead-out region is located between the display region and the signal access region;

a display structure layer, located in the display region;

a touch structure layer, located in the display region and disposed on a side of the display structure layer away from the base substrate;

at least one first power supply line, located in the wiring lead-out region and connected with the display structure layer;

at least one first display signal line, located in the wiring lead-out region and connected with the display structure layer, and located on a side of the first power supply line close to the base substrate; and at least one first touch signal line, located in the wiring lead-out region and connected with the touch structure layer, and located on a side of the first power supply line away from the base substrate, wherein an orthographic projection of the first touch signal line on the base substrate is at least partially overlapped with an orthographic projection of the first power supply line on the base substrate;

wherein the base substrate further comprises: a bending region;

wherein the wiring lead-out region comprises: a first wiring lead-out region and a second wiring lead-out region disposed in sequence along a direction away from the display region; the bending region is located between the first wiring lead-out region and the second wiring lead-out region;

wherein the bending region comprises: at least one first power supply connecting line, at least one touch signal connecting line, and at least one display signal connecting line that are disposed on the base substrate;

wherein the first power supply connecting line, the touch signal connecting line, and the display signal connecting line are of a same layer structure, and the first power supply connecting line is located between the touch signal connecting line and the display signal connecting line;

wherein the display structure layer at least comprises: a drive circuit layer disposed on the base substrate; the drive circuit layer at least comprises: an active layer, a first gate metal layer, a second gate metal layer, and a source-drain metal layer that are disposed on the base substrate;

wherein the first power supply connecting line, the touch signal connecting line, and the display signal connecting line in the bending region are of a same layer structure as the source-drain metal layer in the display region;

wherein the at least one first display signal line in the wiring lead-out region is of a same layer structure as the first gate metal layer or the second gate metal layer in the display region;

wherein the touch structure layer at least comprises a touch electrode layer;

wherein the at least one first touch signal line in the wiring lead-out region is of a same layer structure as the touch electrode layer in the display region; and wherein the first power supply line in the wiring lead-out region is of a same layer structure as the source-drain metal layer in the display region.

* * * * *

UNITED STATES PATENT AND TRADEMARK OFFICE
CERTIFICATE OF CORRECTION

| | | |
|---|---|---|
| PATENT NO. | : 12,164,715 B2 | Page 1 of 1 |
| APPLICATION NO. | : 17/762093 | |
| DATED | : December 10, 2024 | |
| INVENTOR(S) | : Wenhui Gao et al. | |

It is certified that error appears in the above-identified patent and that said Letters Patent is hereby corrected as shown below:

On the Title Page

Item (86), under PCT/CN2021/093055, The 371 (c) Date should be March 21, 2022.

Signed and Sealed this
Twenty-eighth Day of January, 2025

Coke Morgan Stewart
*Acting Director of the United States Patent and Trademark Office*